(12) United States Patent
Ito

(10) Patent No.: US 7,468,961 B2
(45) Date of Patent: Dec. 23, 2008

(54) SYSTEM, APPARATUS, AND METHOD FOR RADIO COMMUNICATION USING A PLURALITY OF CARRIERS

(75) Inventor: Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 1247 days.

(21) Appl. No.: 10/414,671

(22) Filed: Apr. 16, 2003

(65) Prior Publication Data

US 2003/0236071 A1    Dec. 25, 2003

(30) Foreign Application Priority Data

Apr. 17, 2002    (JP) .............................. 2002-115170

(51) Int. Cl.
*H04Q 7/00*    (2006.01)

(52) U.S. Cl. ..................................... 370/329

(58) Field of Classification Search ................ 370/328, 370/329; 455/450, 452.1, 452.2, 522, 69
See application file for complete search history.

(56) References Cited

U.S. PATENT DOCUMENTS

2003/0104831 A1*    6/2003   Razavilar et al. ............ 455/522

FOREIGN PATENT DOCUMENTS

| JP | 11-205276 | 7/1999 |
|---|---|---|
| JP | 11-215095 | 8/1999 |
| JP | 11-317723 | 11/1999 |
| JP | 2000-115119 | 4/2000 |
| JP | 2000-358008 | 12/2000 |
| JP | 2001-103032 | 4/2001 |
| JP | 2001-148682 | 5/2001 |
| JP | 2002-016577 | 1/2002 |
| JP | 2003-174428 | 6/2003 |

* cited by examiner

*Primary Examiner*—Lewis G West
(74) *Attorney, Agent, or Firm*—Finnegan, Henderson, Farabow, Garrett & Dunner, L.L.P.

(57) ABSTRACT

A communication apparatus includes a correction value calculator for calculating a correction value for a received signal, a status determiner for determining a reception status relating to a reception of a plurality of carriers based on the correction value of the correction value calculator, a determination information inserter for inserting determination information in a transmission signal based on the determination of the status determiner, a transmission mode selector for selecting a transmission mode based on the determination information inserted in a transmission signal, a transmission mode information inserter for inserting, into a transmission signal, information relating to the transmission mode selected by the transmission mode selector, and a transmission mode determiner for determining the transmission mode based on the transmission mode information inserted in the transmission signal. Quality of communication is maintained without reducing a transmission rate by using a usable carrier only.

17 Claims, 26 Drawing Sheets

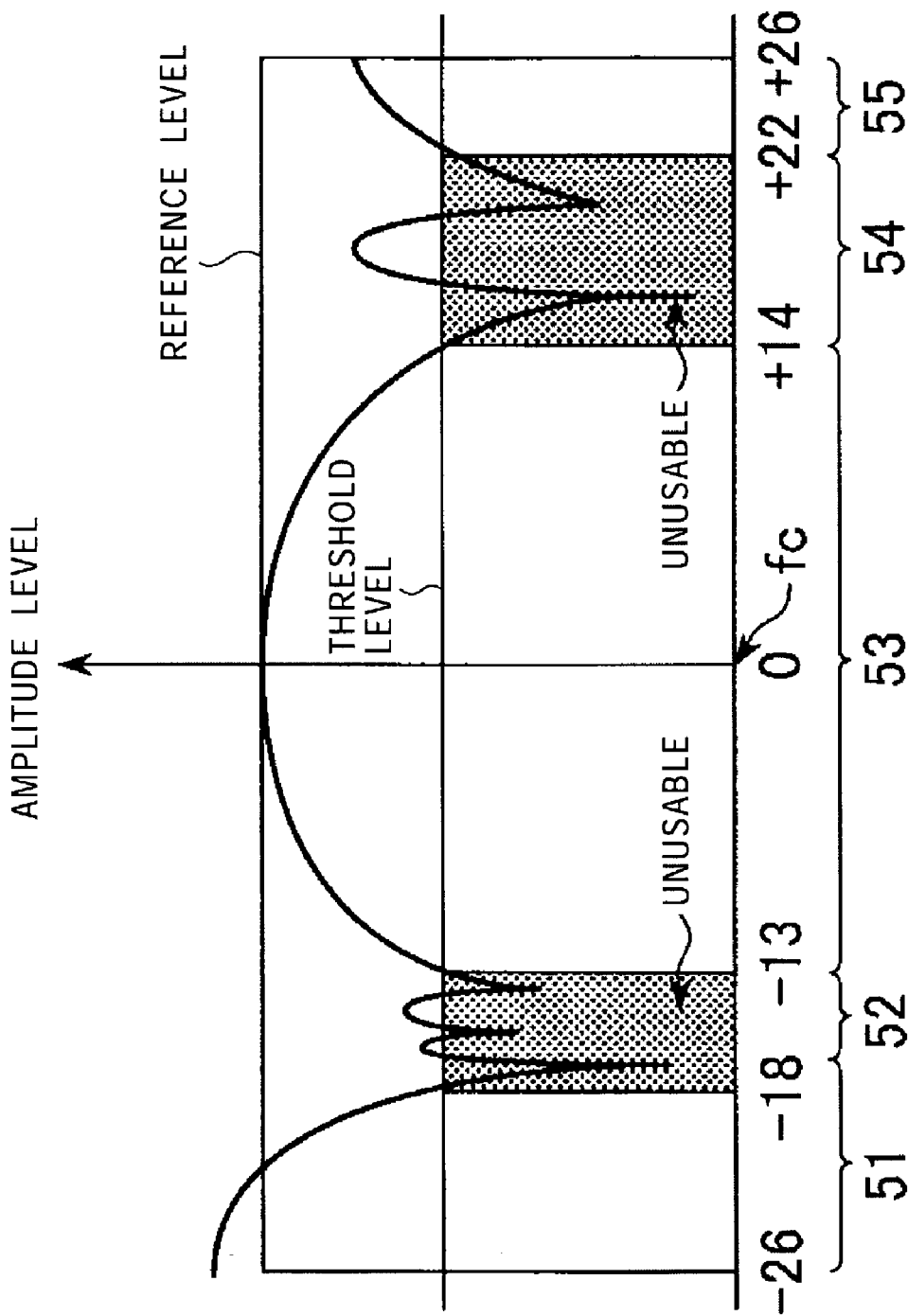

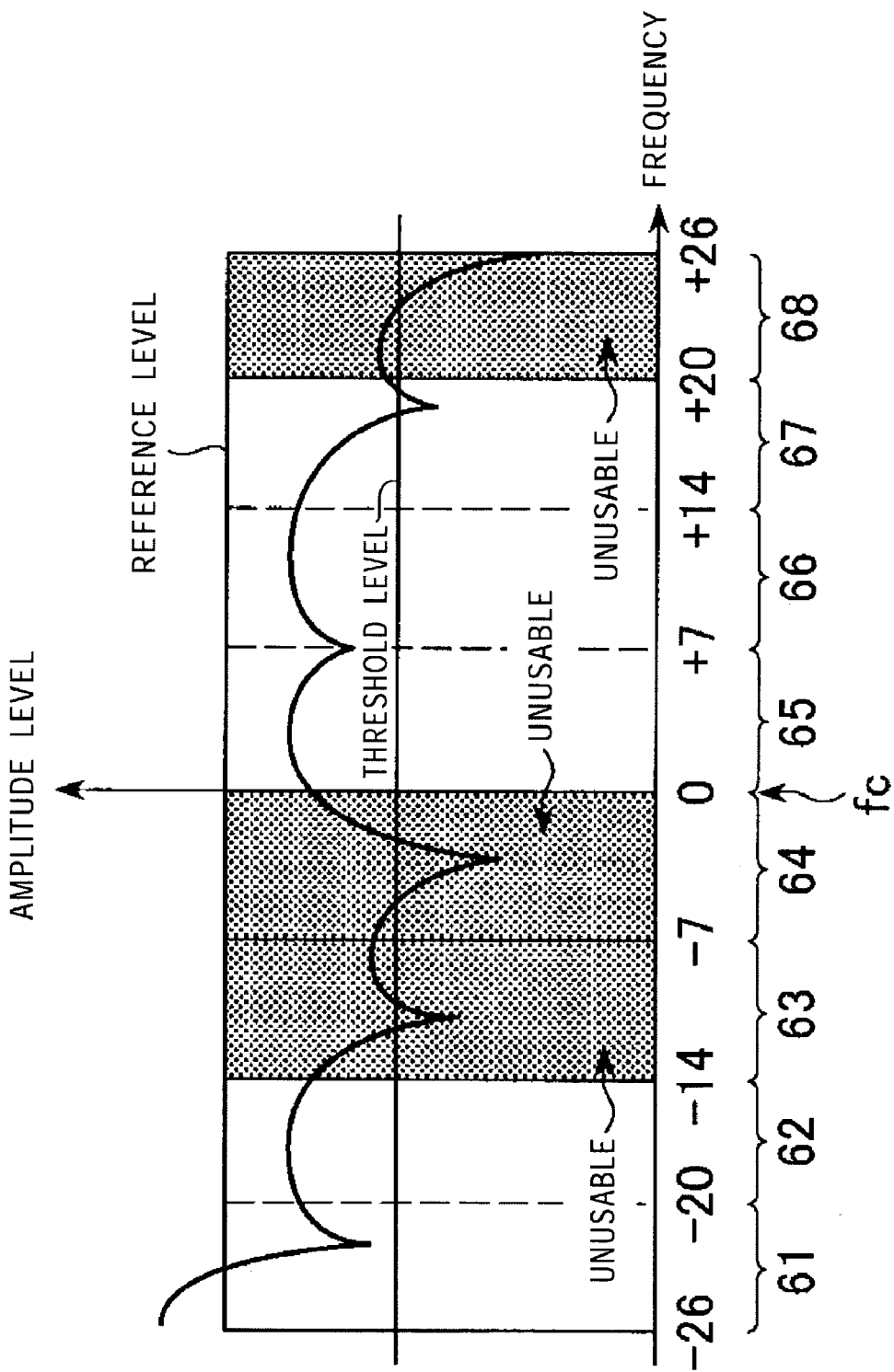

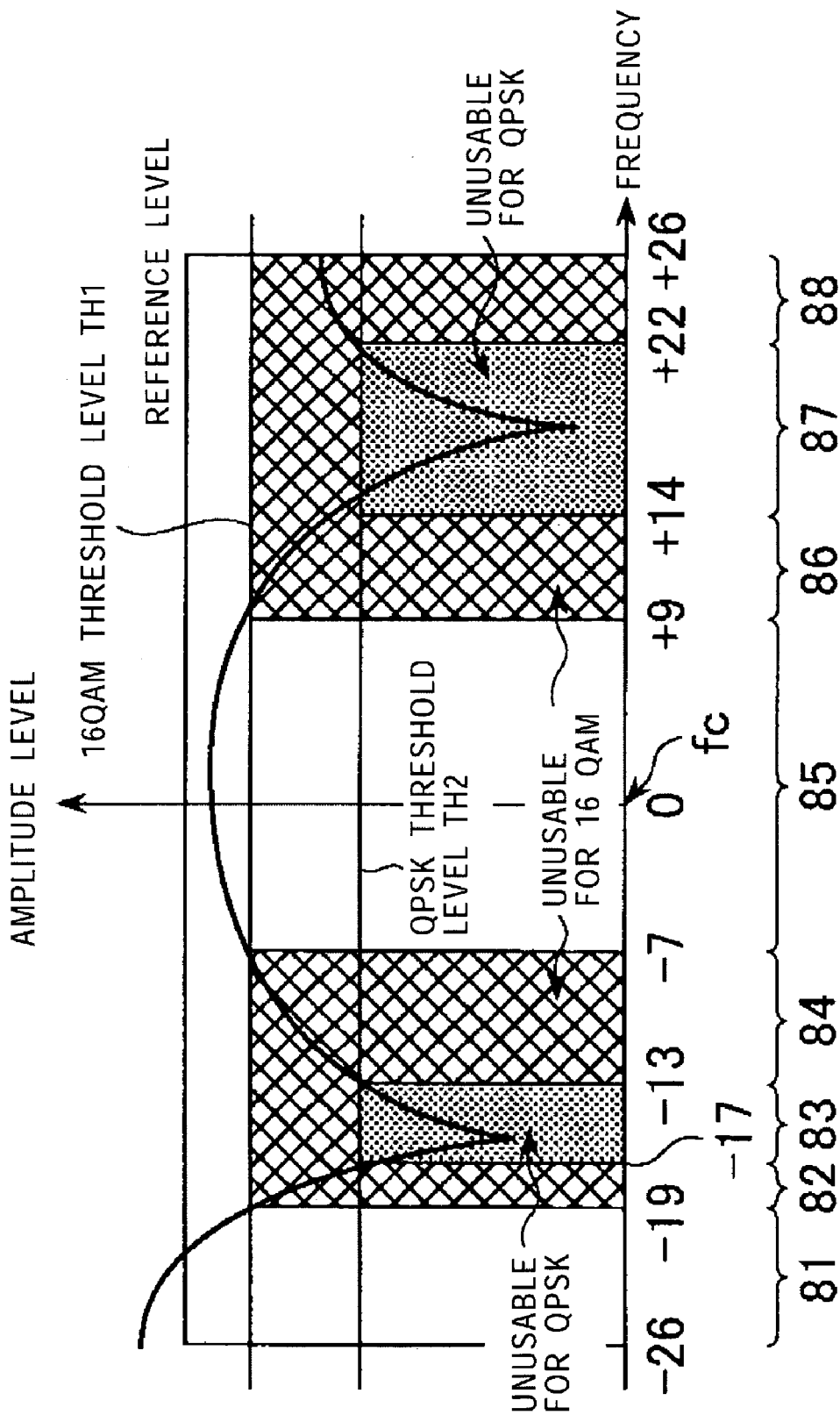

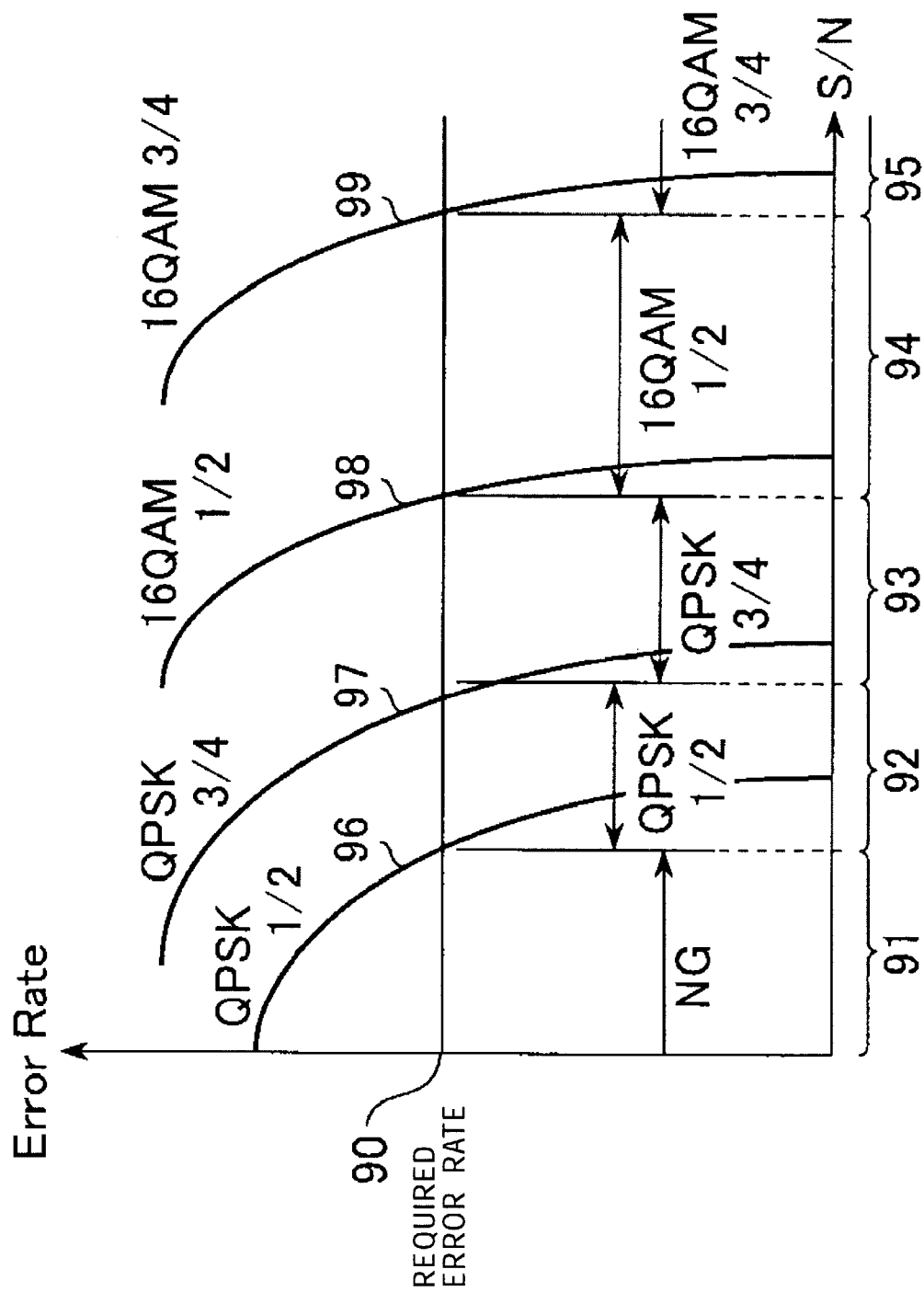

FIG. 13

| USABLE CARRIER PER SYMBOL | MODULATION SCHEME | CODING RATE | EFFECTIVE TRANSMITTED BITS PER SYMBOL |
|---|---|---|---|
| 48 | QPSK | 1/2 | 48 |
| 32 | QPSK | 3/4 | 48 |
| 24 | 16QAM | 1/2 | 48 |
| 16 | 16QAM | 3/4 | 48 |

US 7,468,961 B2

SYSTEM, APPARATUS, AND METHOD FOR RADIO COMMUNICATION USING A PLURALITY OF CARRIERS

BACKGROUND OF THE INVENTION

1. Field of the Invention

The present invention relates to a system, apparatus, and method for transmitting and receiving information using a multi-carrier communication method (such as OFDM (Orthogonal Frequency Division Multiplex)).

2. Description of the Related Art

The OFDM method is known as a modulation scheme to transmit an image at a high speed. The OFDM method is a multi-carrier modulation scheme which transmits multiplexed digital modulated waves having typically tens to several hundreds, sometimes to several thousands, depending on a system, of orthogonal carrier frequencies.

This modulation scheme is insensitive to selective fading, and uses a DFT (Discrete Fourier Transform) to generate multi carriers or FFT (Fast Fourier Transform) that performs a high-speed processing.

The communication using the OFDM typically inserts a repetition pattern called a guard interval in a transmission signal, thereby reducing the effect of multi-path fading.

A demodulated signal is subject to a variation in amplitude and phase rotation under the effect of multi-path fading and the effect of OFDM symbol demodulation timing. To eliminate these effects, a correction process is required. In the correction process, a known pattern symbol, called a reference symbol, is inserted into a transmission signal. In a typical method, a receiver side estimates transmission path characteristic, and multiplies a data symbol in succession to the reference symbol by an inverse version of the estimated transmission path characteristic.

FIG. 24 is a block diagram illustrating a conventional OFDM communication apparatus 2401. The communication apparatus 2401 includes a transmission terminal 2402A, encoder 2403 connected to the transmission terminal 2402A, mapper 2404 connected to the encoder 2403, inverse fast Fourier transform (hereinafter referred to as IFFT) unit 2405 connected to the mapper 2404, frequency converter (hereinafter referred to RF) 2406 connected to the IFFT 2405, fast Fourier transform (hereinafter referred to FFT) unit 2407 connected to the RF unit 2406, correction value calculator 2408 connected to the FFT unit 2407, correction processor 2409 connected to both the FFT unit 2407 and correction value calculator 2408, demapper 2410 connected to the correction processor 2409, demodulator 2411 connected to the demapper 2410, and reception terminal 2402B connected to the demodulator 2411. An antenna 2412 is connected to the RF unit 2406.

The transmission terminal 2402A receives a transmission data signal from the outside. The encoder 2403 receives the transmission data from the transmission terminal 2402A, and performs a convolution process to the transmission data at a designated encoding rate, thereby outputting an encoded data signal.

Upon receiving the encoded data signal from the encoder 2403, the mapper 2404 performs a transformation process (hereinafter referred to as a mapping process) to transform the encoded data signal into a complex symbol (a quadrature phase shift complex symbol, for example) every plurality of bits (every 2 bits, for example), and outputs the complex symbol.

The IFFT unit 2405 performs an inverse fast Fourier transform on the complex symbol obtained in the mapping process of the mapper 2404, thereby generating an OFDM modulated signal.

The RF unit 2406 receives the OFDM modulated signal supplied from the IFFT unit 2405, and frequency converts the signal into a predetermined carrier frequency assigned for signal transmission. Upon receiving frequency converted OFDM modulated signal from the RF unit 2406, the antenna 2412 radiates the corresponding radio wave in the air.

The antenna 2412 receives a radio signal transmitted from another communication apparatus and feeds the signal to the RF unit 2406. The RF unit 2406 frequency converts the received carrier frequency into an intermediate frequency signal, which is then fed to the FFT unit 2407. The FFT unit 2407 obtains an OFDM modulated signal from the received signal that is now the intermediate frequency signal, and Fourier transforms the OFDM modulated signal into a complex symbol in a frequency domain. The correction value calculator 2408 estimates a transmission path based on the output from the FFT unit 2407, thereby calculating a correction value. The correction processor 2409 receives data representing the correction value from the correction value calculator 2408. In response to the data, the correction processor 2409 performs a correction process to eliminate an amplitude variation and phase rotation from the complex symbol output from the FFT unit 2407. The demapper 2410 demaps the complex symbol into a bit, thereby reproducing the data symbol. The demodulator 2411 receives the data symbol, and performs a demodulation process on the symbol at a designated encoding rate, thereby reproducing transmitted data. The reception terminal 2402B serves the function of receiving the reproduced data and outputting received data.

The encoder 2403, mapper 2404, demapper 2410, and demodulator 2411 are all supplied with information concerning an encoding rate, modulation scheme, and carrier assignment. These units are thus operated in response to the supplied information. In a typical setting, each of the encoding rate and modulation scheme is one type and fixed per burst signal, and the carrier assignment is typically fixed in a communication system.

A transmission signal may reach a receiver side in a distorted form under the influence of the transmission path, becoming a reduced power at the receiver side. The correction value calculator 2408 and correction processor 2409 correct the received signal to be a signal power up to a desired level, and the corrected signal is then used by the demapper 2410 connected to the correction value calculator 2408 and correction processor 2409. In the conventional apparatus, the demapper 2410 and demodulator 2411 may process a carrier (received signal) in an extremely poor state with a signal to noise ratio remaining unimproved. A demodulated signal is thus adversely affected, and data is subject to error even after an error correction operation.

If reproduced data still contains an error even after an error correction operation is performed on a signal subsequent to a correction, the receiver side typically issues, to a transmitter side, a request to retransmit data in an attempt to perform correct data communication.

FIG. 25 is a data flow diagram illustrating an operation of two communication apparatuses 2401, having the construction shown in FIG. 24. A transmitter side communication apparatus (hereinafter referred to a communication apparatus A) transmits data to a receiver side communication apparatus (hereinafter referred to a communication apparatus B). Here, the communication apparatus B requests the communication apparatus A to retransmit data.

The communication apparatus A transmits data A to the communication apparatus B, and the communication apparatus B receives the data A (step S2501). The communication apparatus B performs a series of receiving steps including a fast Fourier transform, correction process, demapping process, and demodulation (step S2502). If any error is found in reproduced data, the communication apparatus B requests the communication apparatus A to retransmit the data A (step S2503). If no error is found in the reproduced data, the communication apparatus B transmits a reception end notice (ACK) of the data A to the communication apparatus A.

Upon receiving the request to retransmit, the communication apparatus A transmits the data A to the communication apparatus B again in response (step S2504). The communication apparatus B performs a series of receiving steps including fast Fourier transform, correction process, demapping process, and demodulation (step S2505). If no error is found, the communication apparatus B transmits a reception end notice (ACK) of the data A to the communication apparatus A (step S2506). If any error is found, the communication apparatus B issues a request to retransmit the data A to the communication apparatus A.

Upon receiving the reception end notice (ACK) in step S2506, the communication apparatus A transmits data B subsequent to the data A (step S2507).

The transmitter communication apparatus determines which data to transmit, in response to the reception end notice or request to retransmit coming in from the receiver communication apparatus. In this method, correct data is communicated. As the number of requests to retransmit increases, data transmission rate becomes slow.

Many errors may be found in reproduced data even after an error correction is performed on the signal subsequent to the correction process, and many requests to retransmit may occur. A method typically available in such a case is a fallback method. In the fallback method, a receiver communication apparatus requests a transmitter communication apparatus to modify a modulation scheme of a subcarrier to reduce the number of phases, or to reduce the encoding rate for an error correction to raise an error correction ability. As a result, communication is performed at a reduced transmission rate.

FIG. 26 illustrates a data flow of a conventional fallback process. The operation of the fallback process is discussed below.

The communication apparatus A sends data A to the communication apparatus B (step S2601). Upon receiving the data A, the communication apparatus B performs a series of receiving steps including fast Fourier transform, correction process, demapping process, and demodulation, and then determines, based on the error status of the reproduced data, whether to perform the fallback process (step S2602). If the communication apparatus B determines that the fallback process is required, the communication apparatus B transmits a fallback request to the communication apparatus A (step S2603). If the communication apparatus B determines that no fallback process is required, the communication apparatus B transmits a reception end notice (ACK) to the communication apparatus A.

Upon receiving the fallback request, the communication apparatus A transmits data B in succession to the data A with the modulation scheme and encoding rate modified (step S2604). Upon receiving the data B, the communication apparatus B performs a series of receiving steps including fast Fourier transform, correction process, demapping process, and demodulation, and then determines again, based on the error status of the reproduced data, whether to perform the fallback process (step S2605) If the communication apparatus B determines that no fallback process is required, the communication apparatus B transmits a reception end notice (ACK) to the communication apparatus A (step S2606). If the communication apparatus B determines that the fallback process is required, the communication apparatus B transmits a fallback request to the communication apparatus A.

Upon receiving the reception end notice (ACK), the communication apparatus transmits data C in succession to the data B (step S2607).

In response to the fallback request from the receiver communication apparatus B, the transmitter communication apparatus A modifies the modulation scheme and encoding rate of the data to be transmitted next. The generation of errors is controlled to perform correct communications in this way. However, the fallback request leads to a slow data transmission rate.

To maintain quality of communication from the standpoint of data error in the conventional OFDM communication, data itself may be retransmitted. To increase robustness to data error on a per OFDM subcarrier unit basis, the modulation scheme may be changed to the one which has the reduced number of phases, or the encoding rate of the error correction function may be reduced. These remedies in turn leads to the drawback of a reduced transmission rate.

If it is determined that an error is contained in data received by a communication apparatus, a request to retransmit the same data is repeated until the data is correctly received. The transmission rate is thus reduced. To increase robustness to the error, for example, a current "modulation scheme of 16 QAM with an encoding rate of ½" may be modified to a "modulation scheme of QPSK with an encoding rate of ¾" in response to a fallback request. Such a modification reduces the transmission rate to three-thirds the preceding modulation scheme.

Similarly, when a current "modulation scheme QPSK with an encoding rate of ¾" is modified to a "modulation scheme QPSK with an encoding rate of ½" in response to a fallback request, the transmission rate is reduced to two-thirds the preceding modulation scheme.

SUMMARY OF THE INVENTION

Accordingly, it is an object of the present invention to provide a multi-carrier communication apparatus, and communication method for maintaining quality of communication without degrading a transmission rate.

In a first aspect of the present invention, a communication system for a radio communication method using a plurality of carriers includes a first and second communication apparatuses. Each of the first and second apparatus includes a status determiner for determining a reception status relating to a reception of a plurality of carriers, a determination information inserter for inserting determination information in a transmission signal based on the determination of the status determiner concerning the reception status, a transmission mode selector for selecting a transmission mode based on the determination information inserted into a transmission signal transmitted from a partner apparatus, a transmission mode information inserter for inserting, into a transmission signal, information relating to the transmission mode selected by the transmission mode selector, and a transmission mode determiner for determining the transmission mode by extracting the transmission mode information from a transmission signal containing the transmission mode information inserted therewithin.

Preferably, the communication system includes a modulator for modulating a transmission signal in accordance with a transmission mode selected by the transmission mode selector, and a demodulator for demodulating a received signal in accordance with the result of the determination of the transmission mode determiner.

When the communication system employs an orthogonal frequency division multiplex, the modulator preferably includes an encoder and a mapper directly or indirectly connected to the encoder, and the demodulator preferably includes a demapper and a decoder connected to the demapper.

Preferably, the communication apparatuses share determination information for determining a status of reception of a radio signal. The quality of communication is thus maintained by effectively using a usable carrier without reducing a transmission rate.

In a second aspect of the present invention, a communication apparatus for a radio communication method using a plurality of carriers includes a status determiner for determining a reception status relating to a reception of the plurality of carriers, a determination information inserter for inserting determination information in a transmission signal based on the determination of the status determiner concerning the reception status, a transmission mode selector for selecting a transmission mode based on the determination information inserted in a transmission signal, a transmission mode information inserter for inserting, into a transmission signal, information relating to the transmission mode selected by the transmission mode selector, a modulator for modulating a transmission signal in accordance with the transmission mode, a transmission mode determiner for determining the transmission mode based on the transmission mode information inserted in a transmission signal, and a demodulator for demodulating a transmission signal based on the determination result of the transmission mode determiner.

In a third aspect of the present invention, a communication method using a plurality of carriers includes the steps of determining a reception status relating to a reception of the plurality of carriers, transferring the result of determination of the reception status, selecting a transmission mode of the plurality of carriers based on the determination information result, transferring information relating to the transmission mode in a transmission signal, determining a transmission mode based on the transmission mode information, and demodulating a received signal based on the determined transmission mode.

BRIEF DESCRIPTION OF THE DRAWINGS

FIG. 5 illustrates a determination method of a status determiner that determines status in accordance with information relating to an amplitude component of a received signal;

FIG. 6 illustrates a determination method of a status determiner that determines status in accordance with information relating to an amplitude component of a received signal;

FIG. 8 illustrates a determination method of the status determiner that determines status in accordance with information relating to an amplitude component of a received signal;

FIG. 9 illustrates a sixth determination method of the status determiner;

FIG. 13 illustrates a transmission mode selection table;

DESCRIPTION OF THE PREFERRED EMBODIMENTS

A communication system, communication method, and communication apparatus of the present invention are discussed with reference to the drawings.

The present invention efficiently uses a usable carrier only, by referencing correction coefficient information in a receiving function of the OFDM modulation scheme, thereby maintaining quality of communication without reducing a transmission rate.

The embodiments of the present invention are now discussed.

Communication System

Figure 1:
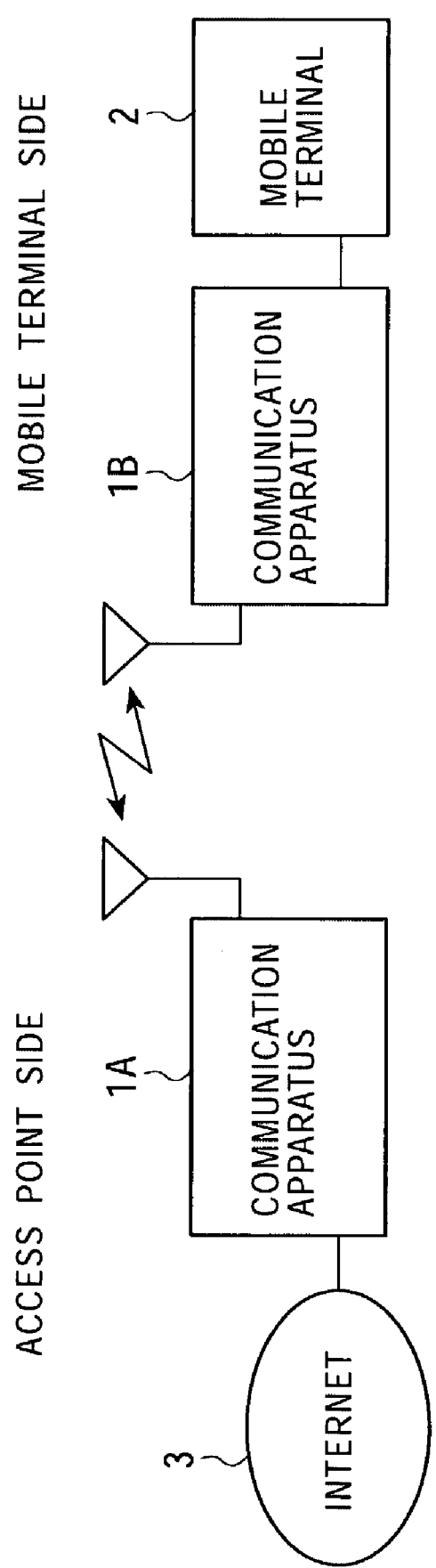
FIG. 1 illustrates a configuration of a communication system in accordance with one embodiment of the present invention.

FIG. 1 illustrates a communication system of one embodiment of the present invention. As shown, the communication system includes a communication apparatus 1A connected to the Internet 3, and communication apparatus 1B connected to a mobile terminal 2. The communication apparatuses 1A and 1B communicate with each other over radio communication. In the communication system, data communication is performed through the communication apparatuses 1A and 1B between the mobile terminal 2 and Internet 3. The communication apparatuses 1A and 1B are identical in construction, and if there is no need for distinguishing between the communication apparatuses 1A and 1B, each is collectively referred to as a communication apparatus 1.

The mobile terminal 2 receives and/or transmits information, and may be an information processing apparatus such as a computer or PDA (Personal Digital Assistant), or an audio visual apparatus such as a video camera, stereo set, or MP3 player. A user of the mobile terminal 2 receives data from the Internet 3, and transmits data to the Internet 3.

Referring to FIG. 1, the Internet 3 and mobile terminal 2 are respectively connected to the communication apparatuses 1A and 1B. The communication system of the present invention is not limited to such a configuration. The communication system may be used to mutually link an information processing apparatus such as a computer or PDA (Personal Digital Assistant), or an audio visual apparatus such as a video camera, stereo set, or MP3 player. Alternatively, the communication system of the present invention may be used to link another communication network to the Internet 3.

The operation of the communication system is discussed below. The communication apparatus 1A accesses the Internet 3. The communication apparatus 1B allows the mobile terminal 2 to access the Internet 3. Data communication is thus performed between the communication apparatus 1A and communication apparatus 1B through radio link.

In the general operation of the entire communication system, the mobile terminal 2 transmits an Internet access request to the Internet 3 through the communication apparatus 1B and communication apparatus 1A, and a reply to the request is then transmitted from the Internet 3 to the mobile terminal 2 through the communication apparatus 1A and communication apparatus 1B.

Figure 2:
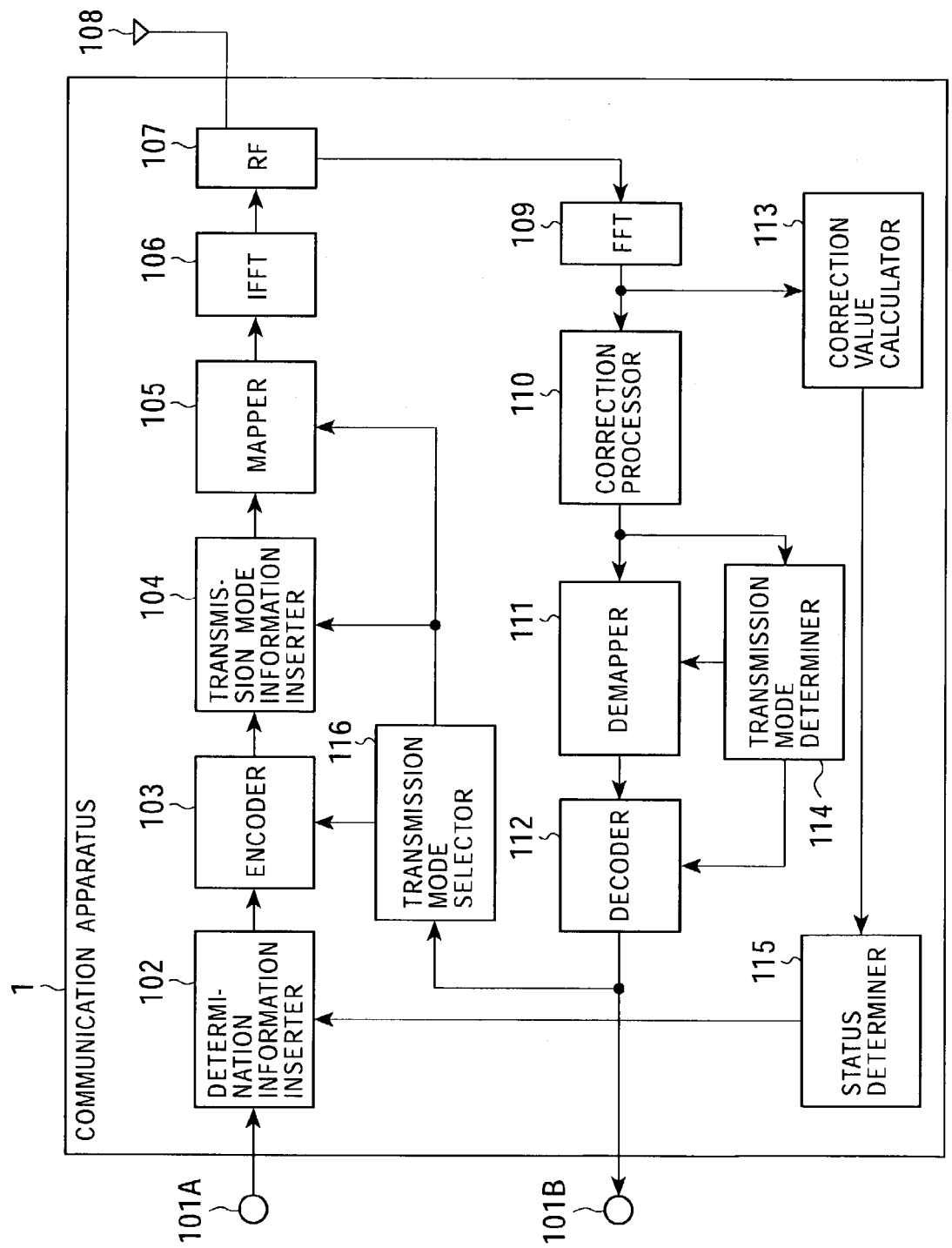
FIG. 2 is a block diagram of the configuration of a communication apparatus in accordance with the embodiment of the present invention.

FIG. 2 is a block diagram of the communication apparatus 1 of the present embodiment. The communication apparatus 1 includes a transmission (input) terminal 101A, determination information inserter 102 connected to the transmission terminal 101A, encoder 103 connected to the determination information inserter 102, transmission mode information inserter 104 connected to the encoder 103, mapper 105 connected to the transmission mode information inserter 104, IFFT unit 106 connected to the mapper 105, RF unit 107 connected to the IFFT unit 106, and antenna 108 connected to the RF unit 107. The communication apparatus 1 further includes an FFT unit 109 connected to the RF unit 107, correction value calculator 113 connected to the FFT unit 109, correction processor 110 connected to both the FFT unit 109 and correction value calculator 113, demapper 111 connected to the correction processor 110, decoder 112 connected to the demapper 111, reception (output) terminal 101B connected to the decoder 112, transmission mode determiner 114, connected to both the demapper 111 and decoder 112, for receiving an output from the correction processor 110, status determiner 115, connected to the determination information inserter 102, for receiving an output from the correction value calculator 113, and transmission mode selector 116, connected to the encoder 103, transmission mode information inserter 104, and mapper 105, for receiving an output from the decoder 112.

The transmission terminal 101A receives transmission data from the outside (such as the Internet or mobile terminal), and feeds the transmission data to the determination information inserter 102.

The determination information inserter 102 receives the transmission data from the transmission terminal 101A, and then transfers the data to the encoder 103. The determination information inserter 102 further-receives determination information from the status determiner 115, and transfers the determination information to the encoder 103.

The encoder 103 receives the transmission data or the transmission data containing the determination information added by the determination information inserter 102, and performs a convolution process on the transmission signal at a predetermined encoding rate for encoding. The transmission data (hereinafter referred to as "encoded data") is then transferred to the transmission mode information inserter 104. The encoder 103 receives transmission mode information from the transmission mode selector 116, and performs an encoding process at a predetermined encoding rate based on the transmission mode information.

The transmission mode information inserter 104 receives the encoded data, while receiving the transmission mode information from the transmission mode selector 116 at the same time. When the transmission mode information inserter 104 receives the transmission mode information, the transmission mode information is transferred together with the encoded data to the mapper 105. When the transmission mode information inserter 104 does not receive the transmission mode information, only the encoded data is transferred to the mapper 105.

The mapper 105 receives the encoded data (containing the transmission mode information) from the transmission mode information inserter 104, and performs a mapping process on a designated carrier (subcarrier) at a designated modulation scheme in accordance with the encoded data, thereby generating a plurality of modulated carriers. The mapper 105 receives the transmission mode information from the transmission mode selector 116, and determines the modulation scheme (QPSK or 16 QAM, for example).

The IFFT unit 106 receives the plurality of modulated carriers from the mapper 105, and performs an inverse fast Fourier transform process on the plurality of modulated carriers, thereby generating an OFDM modulated signal. The OFDM modulated signal is then sent to the RF unit 107.

Upon receiving the OFDM modulated signal from the IFFT unit 106, the RF unit 107 frequency converts the OFDM modulated signal into a predetermined carrier frequency signal.

The frequency converted OFDM modulated signal is fed to the antenna 108, which then radiates the signal into the air.

The antenna 108 receives a radio signal transmitted from another communication apparatus, and feeds the signal to the RF unit 107. The RF unit 107 frequency converts a received signal (OFDM modulated signal) from a carrier frequency signal to an intermediate frequency signal. The intermediate frequency signal is then fed to the FFT unit 109.

The FFT unit 109 obtains an OFDM modulated signal from the intermediate frequency signal, and Fourier transforms the OFDM modulated signal, thereby converting the OFDM modulated signal in time domain into a signal in frequency domain.

The correction value calculator 113 estimates a transmission path based on the output from the FFT unit 109, thereby outputting a correction value.

Upon receiving data representing the correction value from the correction value calculator 113, the correction processor 110 performs a correction process on a complex symbol output from the FFT unit 109 to remove an amplitude variation and phase rotation from the complex symbol, and outputs a corrected complex symbol.

The demapper 111 demaps the corrected complex symbol into a bit corresponding to the symbol, thereby reproducing a data symbol.

The decoder 112 receives the data symbol, and decodes the data symbol at a designated encoding rate, thereby reproducing (transmission) data transmitted from the transmitter side communication apparatus 1.

The reproduced data is fed from the decoder 112 to the reception terminal 101B. The reception terminal 101B serves as an output terminal for outputting the reproduced data (received data) to the outside.

The status determiner 115 receives the correction value (correction coefficient information) calculated by the correction value calculator 113, generates determination information matching a desired condition based on the correction value, and then feeds the determination information to the determination information inserter 102.

The transmission mode determiner 114 receives the signal corrected by the correction processor 110, and extracts the transmission mode information inserted by the transmission mode information inserter 104 in the transmitter communication apparatus 1, from the corrected signal. The transmission mode determiner 114 then feeds the transmission mode information to each of the demapper 111 and decoder 112.

From the decoded data output from the decoder 112, the transmission mode selector 116 extracts determination information inserted by the determination information inserter 102 in the transmitter communication apparatus 1. Based on the determination information, the transmission mode selector 116 selects a transmission mode, and transfers information representing the selected transmission mode (transmission mode information) to each of the encoder 103, transmission mode information inserter 104, and mapper 105.

The encoder 103, mapper 105, demapper 111, and decoder 112 receive information about the modulation scheme, carrier assignment, etc. These pieces of information are designated by the transmission mode determiner 114 or transmission mode selector 116.

When these pieces of information are designated, the communication system uses only a carrier presenting a substantial signal strength rather than using a carrier that suffers from a reduced power as a result of signal distortion under the effect of a transmission path, and a carrier affected by substantial interference. The encoding rate and modulation scheme are designated so that a transmission mode having a higher transmission rate is assigned to the carrier presenting a substantial signal strength. Information about transmission path characteristics is transmitted to a receiver communication apparatus 1 from the status determiner 115 and determination information inserter 102 in the transmitter communication apparatus 1, and is then extracted by the transmission mode selector 116 in the receiver communication apparatus 1. Information about the carrier in use is transmitted through the transmission mode selector 116 and transmission mode information inserter 104 in the transmitter communication apparatus 1, and is then extracted as the mode information by the transmission mode determiner 114 in the receiver communication apparatus 1.

Operation of the Communication System

Figure 3:
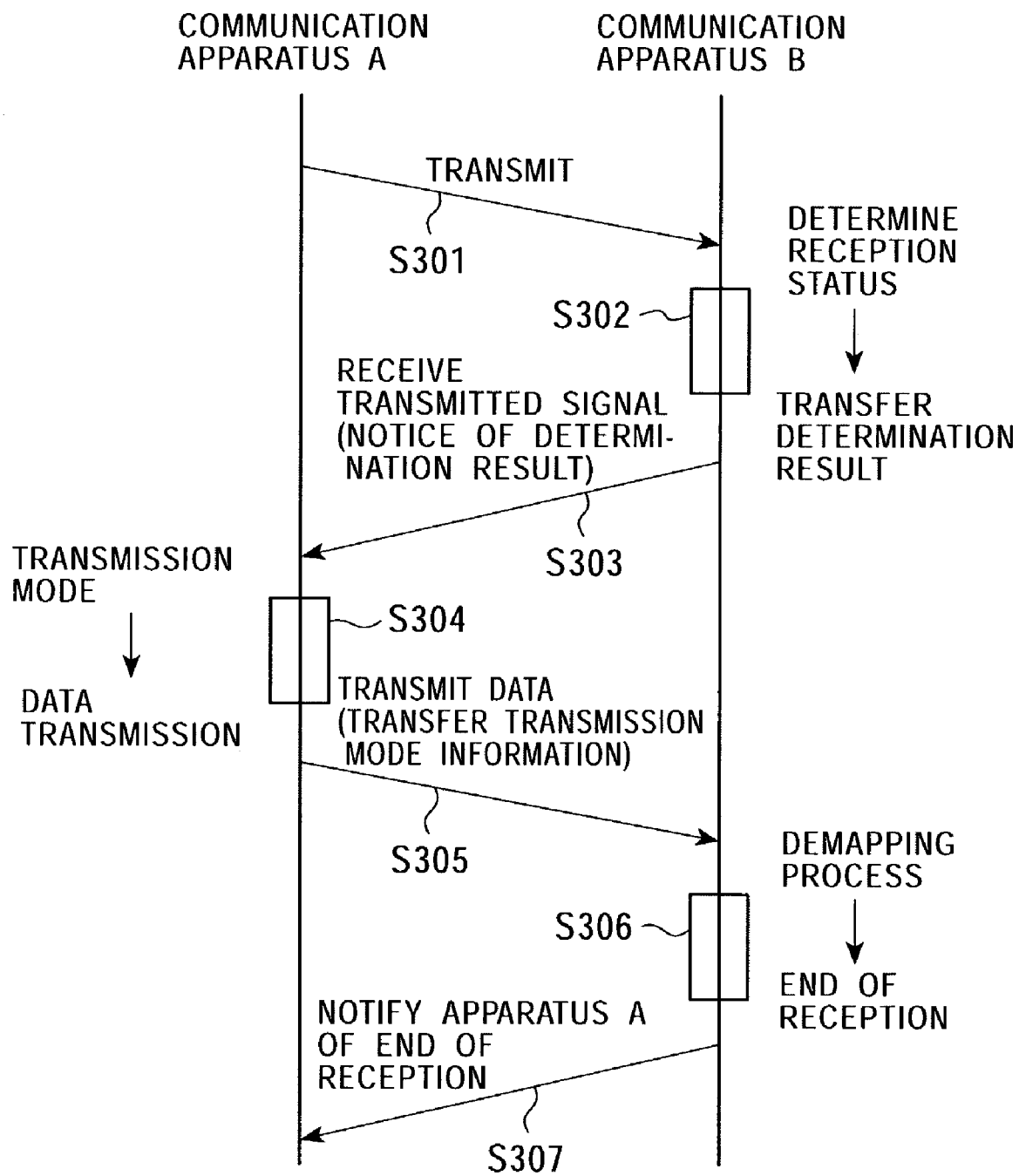
FIG. 3 illustrates a data flow of a communication which is performed in response to a prior transmission request in the communication system illustrated in FIGS. 1 and 2.

FIG. 3 illustrates a data flow of a communication which is performed in response to a prior transmission request in the communication system illustrated in FIGS. 1 and 2. For convenience of explanation, the transmitter communication apparatus is referred to as a communication apparatus A, and the receiver communication apparatus is referred to as a communication apparatus B. The communication apparatuses A and B have the same construction shown in FIG. 2.

Prior to a transmission of transmission data, the communication apparatus A transmits a transmission request signal, and the communication apparatus B receives the transmission request signal (step S301). In response to the transmission request, the communication apparatus B determines a reception status (step S302). The status determiner 115 in the communication apparatus B receives the correction coefficient information from the correction value calculator 113 that has calculated a correction value of the transmission request signal. Based on the correction coefficient information, the status determiner 115 determines a status of a transmission path, and then feeds the resulting determination information to the determination information inserter 102.

The communication apparatus B transmits, to the communication apparatus A, a transmission request reception notice and determination information to notify of the reception of the transmission request and determination information (step S303). The determination information may be inserted into the transmission request reception notice before transmission, or may be separately transmitted.

The communication apparatus A receives the transmission request reception notice while receiving the determination information at the same time, and selects the transmission mode based on the received determination information (step S304). Specifically, the transmission mode determiner 114 in the communication apparatus A extracts the transmission mode information inserted by the transmission mode information inserter 104 in the communication apparatus B from the output of the correction processor 110. The transmission mode determiner 114 determines a demapping method and encoding rate compatible with the transmission mode information, and notifies the demapper 111 and decoder 112 of the determined demapping method and encoding rate. The communication apparatus A thus appropriately reproduces the determination information transmitted from the communication apparatus B. The transmission mode selector 116 in the communication apparatus A extracts the determination information inserted by the determination information inserter 102 from the output of the decoder 112. Based on the determination information, the transmission mode selector 116 determines the transmission mode, and then feeds the determined transmission mode to the encoder 103, transmission mode information inserter 104 and mapper 105.

Subsequent to the determination of the transmission mode (step S304), data is transmitted at the determined transmission mode (step S305). The transmission mode information inserter 104 inserts the transmission mode information into the data to be transmitted. When the data is transmitted in step S305, the data is encoded at a data rate determined by the encoder 103 and mapper 105, and a plurality of subcarriers are modulated at a modulation scheme determined by the transmission mode.

The communication apparatus B determines the transmission mode used by the communication apparatus A from the data transmitted in step S305, and performs processes such as a demapping process in accordance with the transmission mode, thereby reproducing the transmission data (step S307). In the determination of the transmission mode, the transmission mode determiner 114 in the communication apparatus B extracts and reads the transmission mode information contained in the transmission data. Based on the transmission mode obtained, the demapper 111 demaps the transmission data in accordance with the transmission mode, and the decoder 112 decodes the data at an encoding rate determined by the transmission mode.

When a signal is correctly received by the communication apparatus B, the communication apparatus B transmits a reception end notice to the communication apparatus A (step S305) The communication apparatus A receives the reception end notice while transmitting next data at the same transmission mode. The transmission of the data is carried out in the following manner.

If the communication apparatus B determines that a signal is not normally received, the communication apparatus B transmits a request to retransmit the signal to the communication apparatus A. In response to the request to retransmit, the communication apparatus A transmits the data again. The communication apparatus A may select another transmission mode having a lower transmission rate to retransmit the data.

In some of conventional access processes, actual data transmission is performed after a series of procedures of request to transmit and acknowledgement of transmission are completed. The reception status determination and transfer of determination result discussed in connection with this embodiment may be performed in the access process. In this case, the access process is performed without being disturbed requiring no exchange of redundant signals.

The status determination methods carried by the status determiner 115 is now discussed below.

First Determination Method

In a first determination method, the status determiner 115 determines whether the amplitude level of each carrier is above or below a predetermined threshold, based on information about an amplitude component supplied from the correction value calculator 113. The status determiner 115 determines a carrier not above the amplitude level threshold as being unusable.

Figure 4:
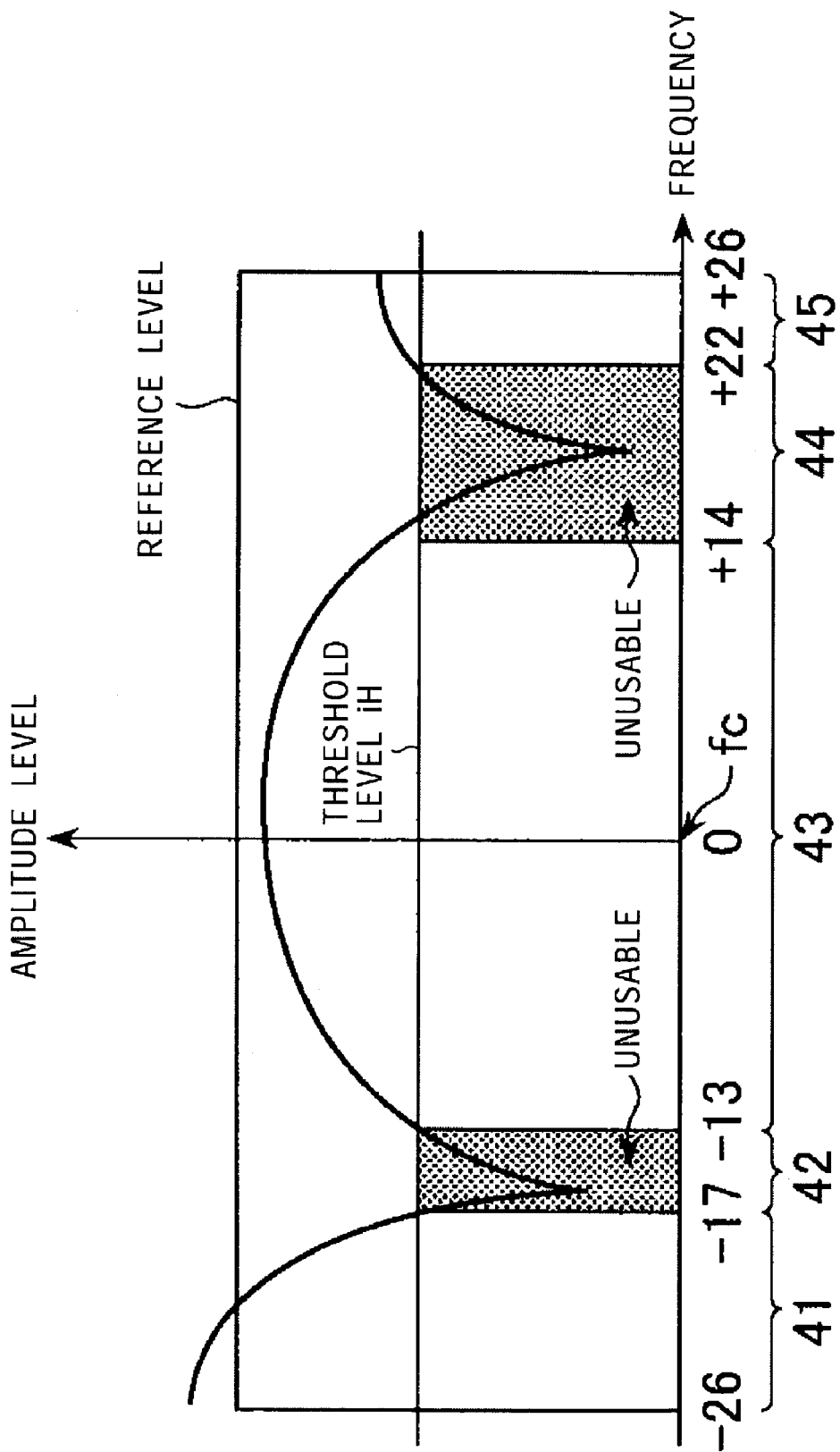
FIG. 4 illustrates a first determination method.

FIG. 4 illustrates the first determination method carried out by the status determiner 115, wherein the amplitude component output from the correction value calculator 113 is used. Specifically, FIG. 4 illustrates a frequency characteristic of a radio signal received by the receiver communication apparatus. As shown, a frequency bandwidth centered on a center frequency fc±26 is used as a transmission band. An amplitude level of the received signals is above a threshold level TH in frequency regions 41, 43, and 45, and the amplitude level of the received signals is equal to or lower than the threshold level TH in frequency regions 42 and 44. Carriers, falling within the frequency regions 42 and 44, and below the threshold level TH, are determined as being unusable.

The correction value from the correction value calculator 113 is typically coefficient information. To handle the coefficient information as an amplitude component, the status determiner 115 must determine the coefficient information in a reciprocal form therewithin. In the construction of the communication apparatus 1 shown in FIG. 2, the need for handing the coefficient information in a reciprocal form is eliminated if a signal from the correction value calculator 113 to the status determiner 115 is separately output as a transmission path estimated value.

Second Determination Method

A second determination method carried out by the status determiner 115 is discussed below. In the second determination method, a plurality of carriers adjacent to one carrier having a level varying in the vicinity of the threshold level under the effect of fading are taken into consideration in determination. One carrier may have an amplitude level above the threshold level, and but if another carrier adjacent to the first carrier has an amplitude level equal to or lower than the threshold level, the first carrier is determined as also being unusable.

The status determiner 115 uses the information relating to the amplitude component supplied from the correction value calculator 113 to determine whether the amplitude level of each carrier is above the predetermined threshold level. A carrier having an amplitude level not above the threshold is determined as being unusable. However, if a carrier having an amplitude level above the threshold is adjacent to a carrier having an amplitude level not above the threshold, the first carrier is determined as also being unusable.

FIG. 5 illustrates a determination method of the status determiner 115 that determines status in accordance with information relating to an amplitude component, out of the correction coefficient information output from the correction value calculator 113. Specifically, FIG. 5 illustrates a frequency characteristic of a radio signal received by the receiver communication apparatus. As shown, a frequency bandwidth centered on a center frequency fc±26 is used as a transmission band. An amplitude level of the received signals is above a threshold level TH in frequency regions 51, 53, and 55. An amplitude level of the received signals is partly below and partly above the threshold level TH in frequency regions 52 and 54. In accordance with the second determination method, all carriers contained in the frequency regions 52 and 54 are determined as being unusable. However, in accordance with the first determination method, carriers in portions of the frequency regions 52 and 54 having the amplitude level above the threshold level TH are determined as being usable.

The amplitude level shown in FIG. 5 is referenced here. The present invention is not limited to the use of the amplitude level only. The present invention implements a determination method which uses the correction coefficient information supplied from the correction value calculator 113 from a more general standpoint.

Third Determination Method

A third determination method carried out by the status determiner 115 is discussed below. In the third determination method, a plurality of carriers are grouped, and carriers in each of the groups are analyzed from a more general standpoint to determine whether or not the carriers contained in each group are usable.

FIG. 6 illustrates the third determination method of the status determiner 115 that determines status in accordance with information relating to an amplitude component out of the correction coefficient information supplied from the correction value calculator 113. Specifically, FIG. 6 illustrates a frequency characteristic of a radio signal received by the receiver communication apparatus. As shown, a frequency bandwidth centered on a center frequency fc±26 is used as a transmission band. The transmission band is segmented into a plurality of groups 61 through 68. Each group contains a plurality of carriers. The groups contain not necessarily the same number of carriers per group. As shown in FIG. 6, each of all carriers of received signals in the frequency regions of groups 61, 62, 65, 66, and 67 has an amplitude level above the threshold level TH. An amplitude level of received signals in some carriers is below the threshold level TH in frequency regions 63, 64, and 68, but an amplitude level of received signal in other carriers is above the threshold level TH in frequency regions 63, 64, and 68. In accordance with the third determination method, the status of the carriers in each group is analyzed to determine all carriers contained in groups 63, 64, and 68 as being unusable from the general standpoint. A variety of methods to determine all carriers from the general standpoint are contemplated. For example, one group is determined as being unusable if the number of carriers in that group having an amplitude level equal to or lower than the threshold level TH exceeds a predetermined number (for example, half the total number of carriers contained in that group). Alternatively, one group is determined as being unusable if the sum of the levels of the number of carriers in that group having an amplitude level equal to or lower than the threshold level TH exceeds a predetermined amount. Any method is acceptable as long as the method renders unusable a group that could cause an error in the transmission data.

The amplitude level shown in FIG. 6 is referenced here to determine the usable/unusable status of the groups. The present invention is not limited to the use of the amplitude level only. The present invention implements a determination method which uses the correction coefficient information supplied from the correction value calculator 113 from a more general standpoint rather than using the amplitude level only contained in the correction coefficient information.

Fourth Determination Method

A fourth determination method carried out by the status determiner 115 is discussed below. In the fourth determination method, the status determiner 115 uses information relating to a phase component out of the correction coefficient information supplied from the correction value calculator 113. Taking into consideration a phase difference between adjacent carriers, carriers contained in a region which is subject to a large phase variation are determined as being unusable.

Figures 7A, 7B:
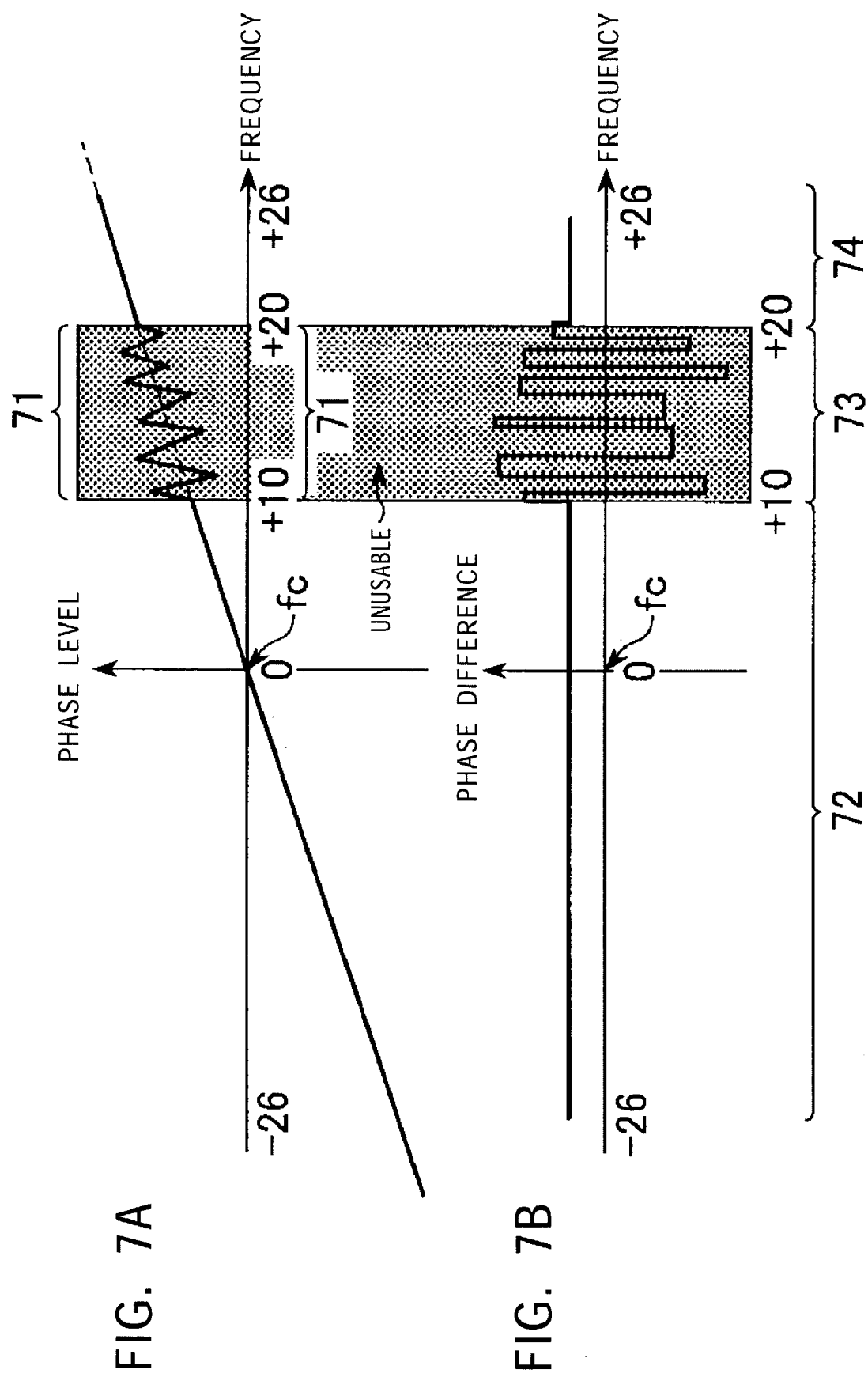
FIG. 7A illustrates a phase level of a radio signal received by a receiver side communication apparatus.
FIG. 7B illustrates a phase difference between adjacent carriers into which the phase level illustrated in FIG. 7A is converted.

FIG. 7A illustrates the fourth determination method in which the status determiner 115 determines the status of reception in accordance with information relating to a phase component out of the correction coefficient information supplied from the correction value calculator 113. Specifically, FIG. 7A illustrates the phase level of a radio signal received by the receiver communication apparatus. As shown, a frequency bandwidth centered on a center frequency fc±26 is used as a transmission band. Since a phase difference between adjacent carriers typically remains constant, the phase level changes at a constant rate. If the phase of the carriers is disturbed due to multi-path interference, for example, the change of the phase level fails to be constantly changing. FIG. 7A illustrates a variation in the phase level in a region 71. FIG. 7B illustrates a phase difference between adjacent carriers into which the phase level illustrated in FIG. 7A is converted. The phase difference between adjacent carriers remains constant in regions 72 and 74 in FIG. 7B, but the phase difference between adjacent carriers is varied in a region 73. The decoder 112 uses information relating to the phase component out of the correction coefficient information supplied from the correction value calculator 113 to determine whether a region suffering from a variation in phase difference is present. If the decoder 112 determines that a region suffering from a variation in phase difference is present, the status determiner 115 determines the carriers contained in that region as being unusable.

Fifth Determination Method

A fifth determination method carried out by the status determiner 115 is discussed below. In the fifth determination method, data is transmitted using a plurality of different modulation schemes, and threshold levels are respectively set up for the different modulation schemes. The status determiner 115 detects whether the amplitude level of each carrier is above the respective threshold level TH. If the carrier having an amplitude level is not above the threshold level, the status determiner 115 determines the modulation scheme of that carrier as being unusable.

FIG. 8 illustrates the fifth determination method of the status determiner 115 that determines status in accordance with information relating to an amplitude component out of the correction coefficient information supplied from the correction value calculator 113. Specifically, FIG. 8 illustrates a frequency characteristic of a radio signal received by the receiver communication apparatus. As shown, a frequency bandwidth centered on a center frequency fc±26 is used as a transmission band. In the fifth determination method, two different modulation schemes 16 QAM and QPSK are used, and threshold levels TH1 and TH2 are respectively set up for the modulation schemes 16 QAM and QPSK.

The status determiner 115 respectively compares the amplitude levels of the carriers the threshold levels TH1 and TH2. If the amplitude level of a carrier is below at least one of the threshold levels TH1 and TH2, the status determiner 115 determines the modulation scheme of that carrier as being unusable. Since the amplitude level is above each of the threshold levels TH1 and TH2 in frequency regions 81 and 85 as shown, the status determiner 115 determines the two modulation schemes as being usable. In frequency regions 82, 84, 86, and 88, the amplitude level is above the threshold TH2, but is below the threshold TH1. The status determiner 115 thus determines the 16 QAM modulation scheme corresponding to the threshold level TH1 as being unusable (with the QPSK as being usable). In frequency regions 83 and 87, the amplitude level is below the two threshold levels TH1 and TH2, and the status determiner 115 determines the two modulation schemes as being unusable.

A required error rate prior to or subsequent to error correction in the modulation scheme may be treated as a target in setting a plurality of threshold levels. Alternatively, the threshold level may be changed in accordance with an encoding rate subsequent to error correction. A plurality of threshold levels may be set using another threshold level setting method other than the ones already discussed here.

Sixth Determination Method

A sixth determination method carried out by the status determiner 115 is discussed below. In the sixth determination method, a usable transmission mode is determined based on a required error rate. A threshold level (a required error rate) is set so that an error rate in data subsequent to the error correction carried out by the decoder 112 reaches the desired value, and the transmission mode is determined to achieve the required error rate at an S/N ratio in a received signal.

FIG. 9 illustrates the sixth determination method carried out by the status determiner 115. Specifically, FIG. 9 illustrates error rate characteristics of four different transmission modes of ½-rate QPSK, ¾-rate QPSK, ½-rate 16 QAM, and ¾-rate 16 QAM. As shown, the required error rate is set at a threshold level of 90. The S/N ratio range is segmented into five regions of 91 through 95 by intersections of characteristic curves 96, 97, 98, and 99 of the respective transmission modes with the threshold level of 90. Depending on which one of the regions 91 through 95 the S/N ratio of a received signal falls within, the status determiner 115 determines the transmission mode as being usable. Specifically, if the S/N ratio of the received signal falls within the region 91, the status determiner 115 determines that none of the transmission modes is usable. If the S/N ratio of the received signal falls within the region 92, the status determiner 115 determines the transmission mode ½-rate QPSK is usable. If the S/N ratio of the received signal falls within the region 93, the status determiner 115 determines the transmission mode ¾-rate QPSK is usable. If the S/N ratio of the received signal falls within the region 94, the status determiner 115 determines the transmission mode ½-rate 16 QAM is usable. If the S/N ratio of the received signal falls within the region 95, the status determiner 115 determines the transmission mode ¾-rate 16 QAM is usable.

Determination Information Transfer Methods

Discussed next is a determination information transfer method in which the determination information inserter 102 inserts the determination information into transmission data after the status determiner 115 determines the reception status through one of the above-referenced determination methods.

First Determination Information Transfer Method

A first determination information transfer method applicable to the present embodiment is discussed below.

Figure 10:
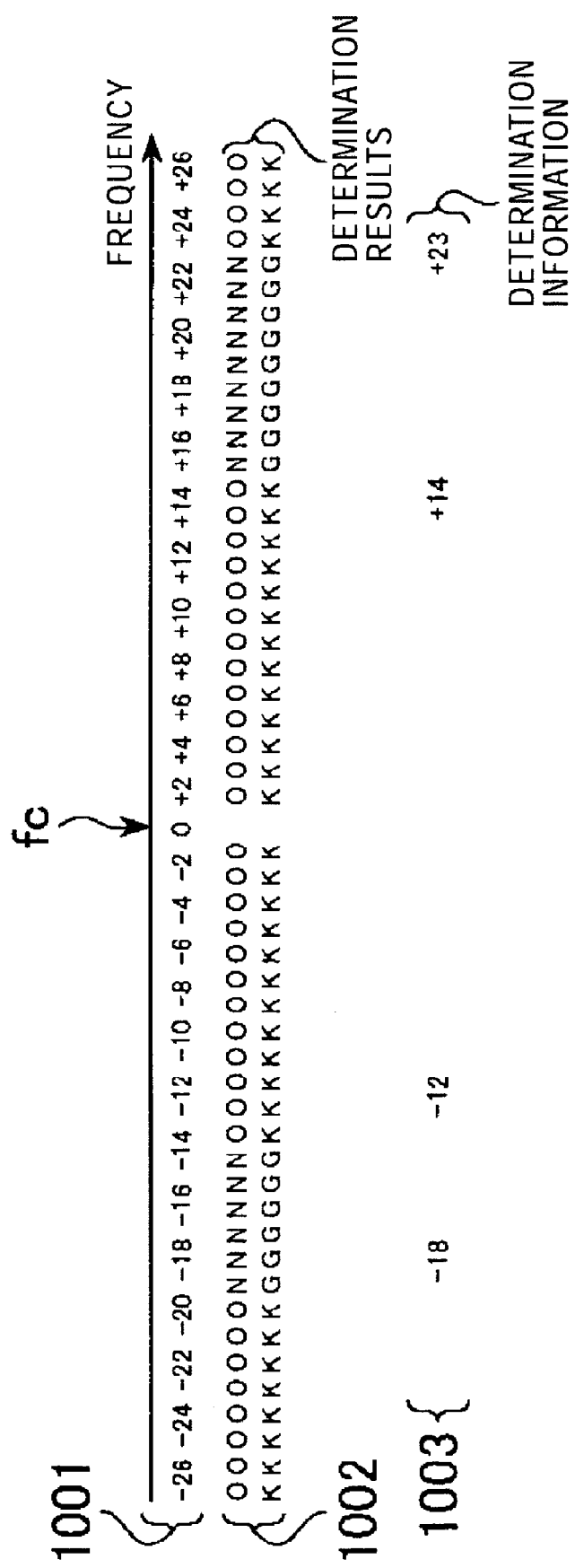
FIG. 10 illustrates a first determination information transfer method.

FIG. 10 illustrates the first determination information transfer method. In the first determination information transfer method, the determination information is inserted on a plurality of carriers in a collective manner rather on a per carrier basis. Carrier numbers of respective carriers having different determination results are transferred with a usable/unusable status toggled.

As shown, a frequency bandwidth centered on a center frequency fc±26 is used as a transmission band. Used here are 52 (=26×2) carriers. A sequence of signals 1002 represents determination result information which is fed to the determination information inserter 102 by the status determiner 115. The label "OK" indicating that the carrier is usable, or the label "NG" indicating that the carrier is unusable is generated for each carrier. A sequence of signals 1003 is an example of determination information which is inserted into the transmission data by the determination information inserter 102. The determination information includes a carrier number "−18" at which the determination result is transitioned from "OK" to "NG", a carrier number "−12" at which the determination result is transitioned from "NG" to "OK", a carrier number "+14" at which the determination result is transitioned from "OK" to "NG", and a carrier number "+23" at which the determination result is transitioned from "NG" to "OK". The transmitter communication apparatus 1 transmits information of "−18, −12, +14, and +23" as the determination information. Upon receiving the information, the communication apparatus 1 determines from the determination information that the determination result is "OK" from the carrier number −26 through the carrier number −17, that the determination result is "NG" from the carrier number −18 through the carrier number −11, that the determination result is "OK" from the carrier number −12 through the carrier number +13, that the determination result is "NG" from the carrier number +14 through the carrier number +22, and that the determination result is "OK" from the carrier number +23 through the carrier number +26.

The first determination information transfer method substantially reduces the amount of information to be transmitted, compared with the case in which the determination result is transmitted on a per carrier basis.

The first determination information transfer method is appropriate for use with the first, second, and fourth determination methods.

Second Determination Information Transfer Method

Figure 11:
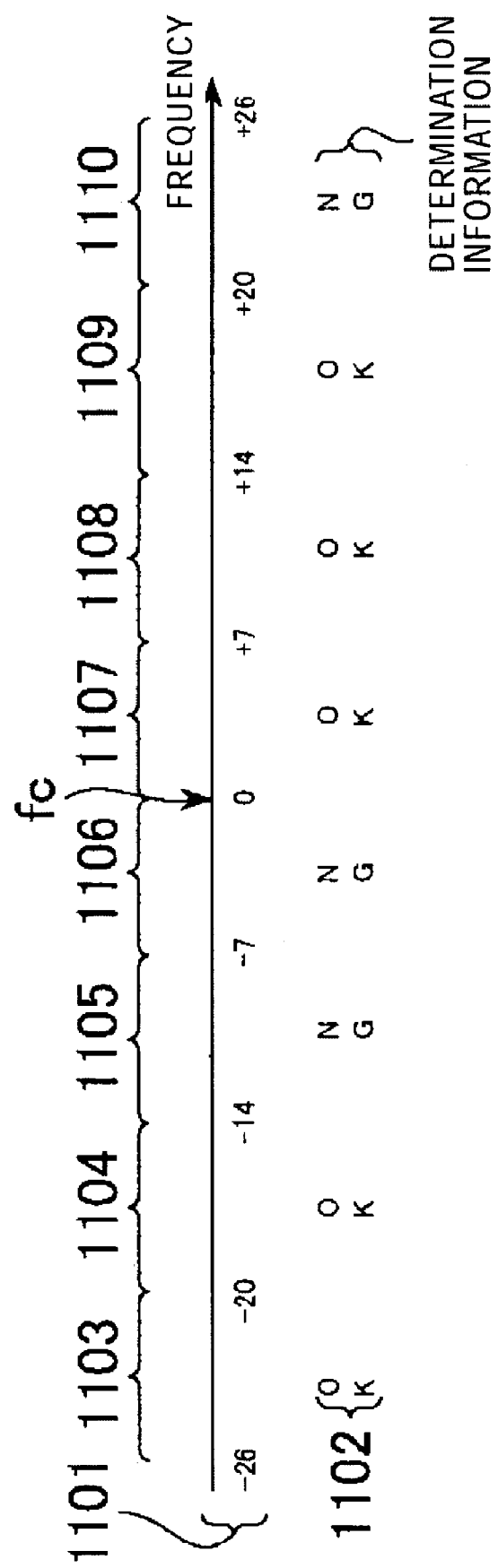
FIG. 11 illustrates a second determination information transfer method.

A second determination information transfer method applicable to the present embodiment will now be discussed. In the second determination information transfer method, the determination result of the usable/unusable status of each carrier is transferred on a group by group basis. As shown in FIG. 11, a transmission band 1101 having the center frequency fc±26 is segmented into a plurality of groups 1103, 1104, 1105, 1106, 1107, 1108, 1109, and 1110. In the second determination transfer method, the determination result 1102 indicating the usable/unusable status of each carrier contained in each group is provided on a per group basis rather than on a carrier basis. As shown, the determination information "OK, OK, NG, NG, OK, OK, OK, and NG" is inserted into the transmission information before transmission.

The second determination information transfer method substantially reduces the amount of information to be transmitted, compared with the case in which the determination result is transmitted on a per carrier basis.

The second determination information transfer method is appropriate for use with the third determination method.

Third Determination Information Transfer Method

Figure 12:
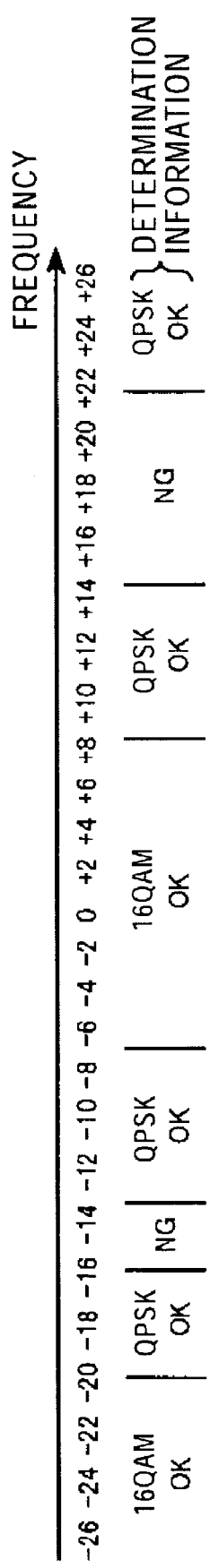
FIG. 12 illustrates a third determination information transfer method.

A third determination information transfer method applicable to the present embodiment will now be discussed. In the third determination information transfer method, the determination result of the usable/unusable status of each carrier is transferred on a group by group basis. FIG. 12 illustrates the third determination information transfer method carried out by the determination information inserter 102 which inserts a result which is determined under determination conditions different from carrier to carrier. The third determination information transfer method is appropriate for use with the fifth determination method shown in FIG. 8 or for use with the sixth determination method shown in FIG. 9.

Selection of the Transmission Mode

The selection of the transmission mode carried out by the transmission mode selector 116 is discussed below. The selection of the transmission mode corresponds to step S304 shown in FIG. 3.

First Transmission Mode Selection Method

A variety of selection methods for selecting the transmission mode is contemplated in the present embodiment. A first transmission mode selection method is discussed below. A plurality of combinations, each combination of the number of usable carriers per symbol, modulation scheme, and encoding rate are set so that the transmission rate in communication remains constant. In accordance with the number of usable carriers per symbol identified by determination information, the transmission mode of the carrier corresponding to that symbol is determined.

FIG. 13 illustrates a transmission mode selection table. The table lists and stores combinations of the number of usable carriers per symbols, modulation scheme, and encoding rate resulting in a constant transmission rate (48 bits/second per symbol here), namely, "48, QPSK, and ½", "32, QPSK, and ¾", "24, 16 QAM, and ½", and "24, 16 QAM, and ½". The transmission mode selector 116 obtains the number of usable carriers per symbol from the extracted determination information, selects a modulation scheme and encoding rate from the table, in accordance with the number of carriers as a key, as a transmission mode. For example, if the number of carriers usable for per symbol is "48", the transmission mode selector 116 selects the transmission mode with the modulation scheme of the QPSK and an encoding rate of ½ by referencing the table. If the number of carriers usable for another symbol is "24", the transmission mode selector 116 selects the transmission mode with the modulation scheme of the 16 QAM and an encoding rate of ½ by referencing the table. The same transmission mode is selected on all carriers assigned to the same symbol. Since the transmission rate remains constant on all symbols in the transmission mode selection method, the present invention provides a stable environment to a host module having a hierarchically higher function.

Second Transmission Mode Selection Method

A second transmission mode selection method applicable to the present embodiment is discussed below. In the second transmission mode selection method, the same power mapping point as in the conventional art is assigned to only the carrier in use, and no signal power is assigned to an unused carrier.

Figure 14:
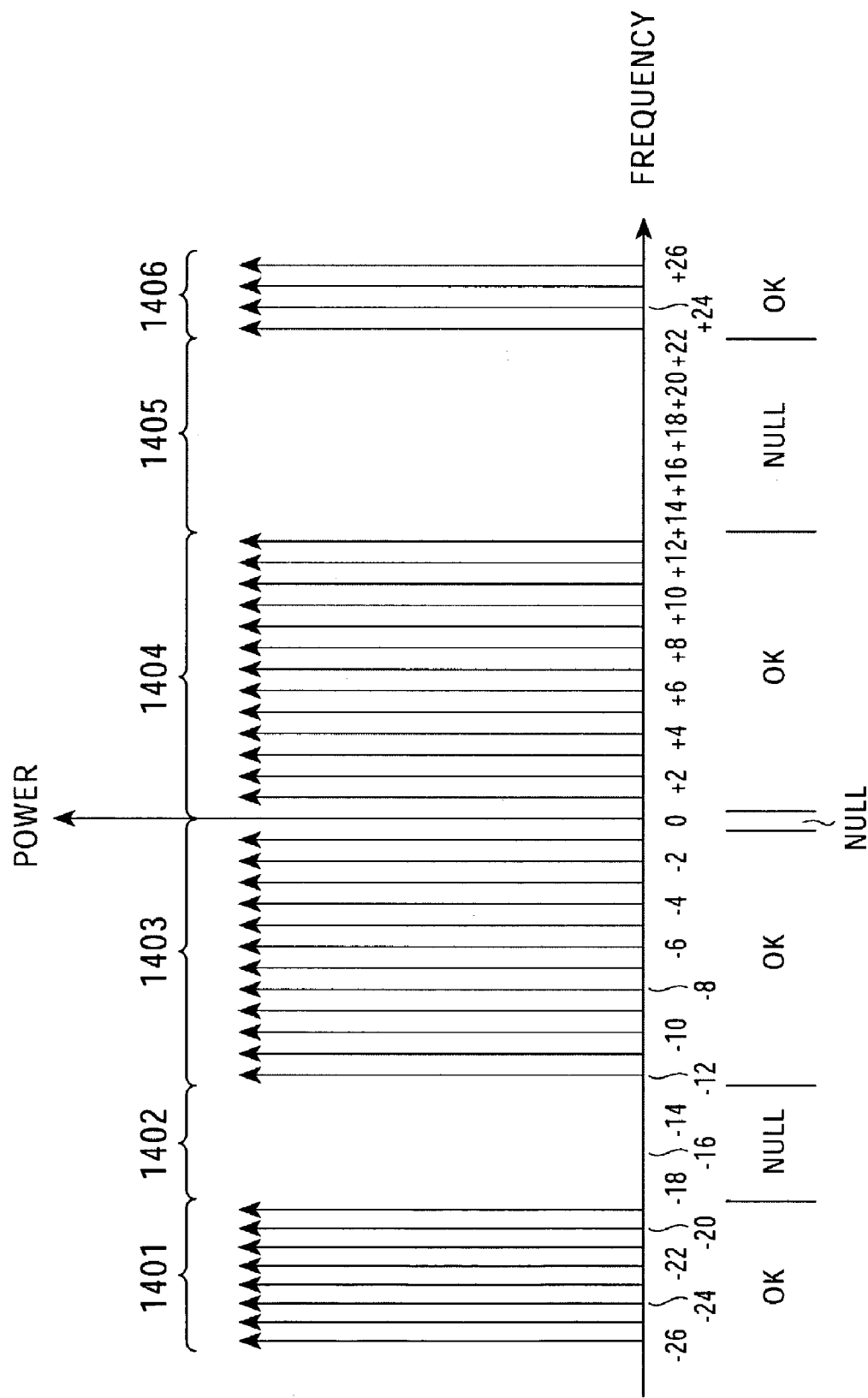
FIG. 14 illustrates power imparted to each carrier transmitted from the communication apparatus.

FIG. 14 illustrates power imparted to each carrier transmitted from the communication apparatus 1 in the transmission mode selected in the second transmission mode selection method. The transmission mode is selected when the determination information is inserted in the state shown in FIG. 5.

In the second transmission mode selection method, the transmission mode selector 116 controls the mapper 105 so that a carrier to be used and an unused carrier are determined based on the determination information inserted in the transmission data. The same power mapping point as in the conventional art is assigned to the carrier to be used, and no signal power is assigned to the unused carrier. As shown in FIG. 14, based on the determination information that represents that the carriers in the regions 52 and 54 shown in FIG. 5 are unusable, the transmission mode selector 116 assigns the same power mapping point as in the conventional art to the carriers contained in regions 1401, 1403, 1404, and 1406, but assigns no signal power to the carriers contained in regions 1402 and 1405.

Although a signal power of the symbol varies depending on the carrier frequency in use, useless power consumption is prevented, and transmission power is efficiently used. Since the number of carrier frequencies is reduced, a response in peak amplitude in time is lowered in level. Distorted component viewed from the entire transmission system is reduced, leading to performance improvements.

Third Transmission Mode Selection Method

A third transmission mode selection method applicable to the present embodiment is discussed below. In the third transmission mode selection method, a carrier to be used and an unused carrier are determined based on the determination information inserted in the transmission data. Power mapping points are assigned to the carriers to be used so that each symbol is at the same power level, and no signal power is assigned to the unused carriers. It is not a requirement that the mapping (transmission mode) of the unused carrier (with no information contained therewithin) agrees with the mapping of the used carrier (with information contained therewithin).

Figure 15:
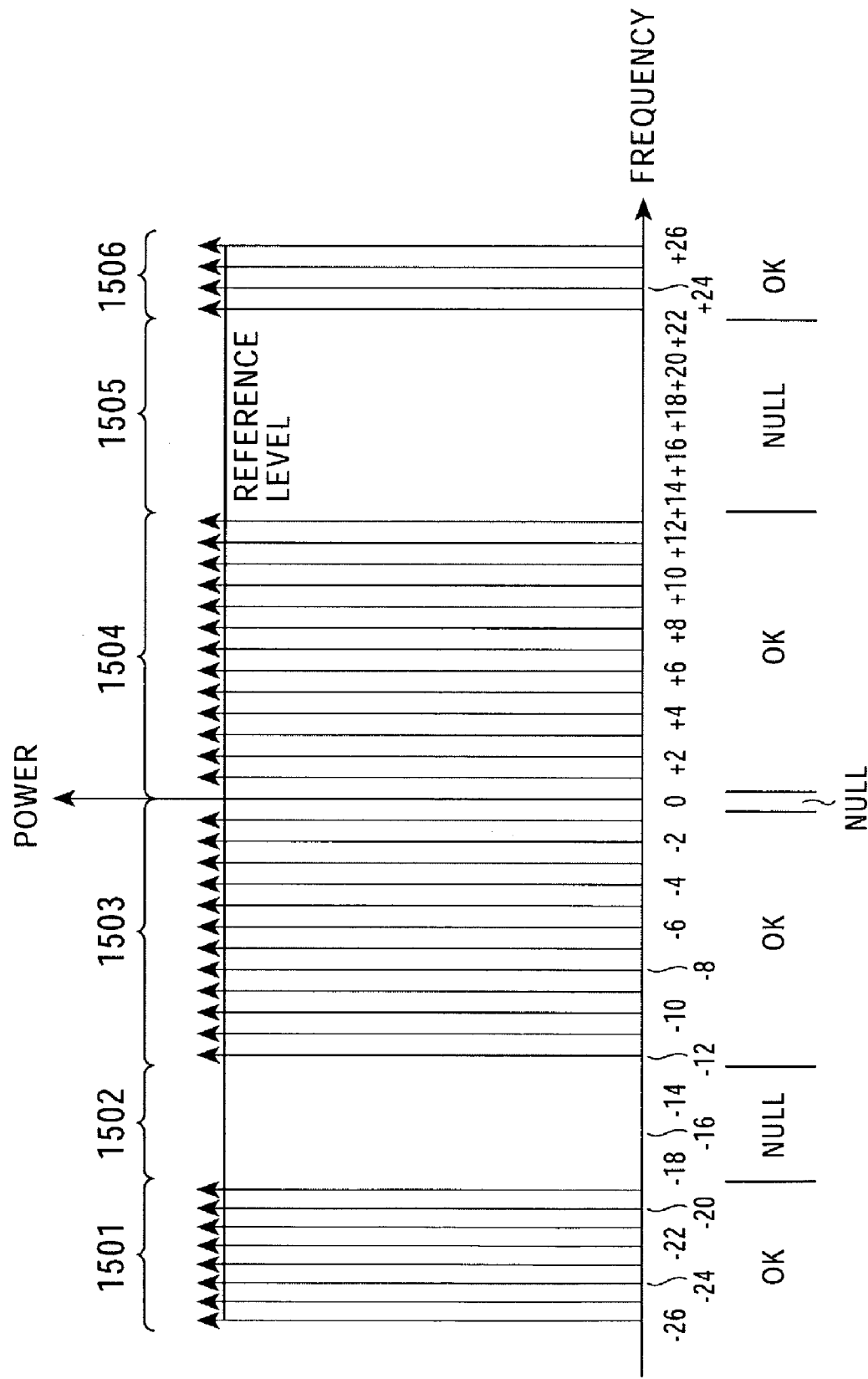
FIG. 15 illustrates power imparted to each carrier transmitted from the communication apparatus.

FIG. 15 illustrates power imparted to each carrier transmitted from the communication apparatus 1 in the transmission mode selected in the third transmission mode selection method. The transmission mode is selected when the determination information is inserted in the state shown in FIG. 5. As shown in FIG. 15, no signal power is assigned to the unused carriers contained in regions 1502 and 1505, and mapping points are assigned to the carriers contained in regions 1501, 1503, 1504, and 1506 so that the symbols are at the same power level.

Regardless of the carriers, the third transmission mode selection method provides substantially constant signal strength, and improves the S/N ratio of the carrier in use, thereby improving performance characteristics.

Fourth Transmission Mode Selection Method

A fourth transmission mode selection method applicable to the present embodiment is discussed below. In the fourth transmission mode selection method, a carrier to be used and an unused carrier are determined based on the determination information inserted in the transmission data. Power mapping points are assigned to the unused carriers so that each symbol is at the same power level as the conventional symbols. It is not a requirement that the mapping (transmission mode) of the unused carrier (with no information contained therewithin) agrees with the mapping of the used carrier (with information contained therewithin).

Figure 16:
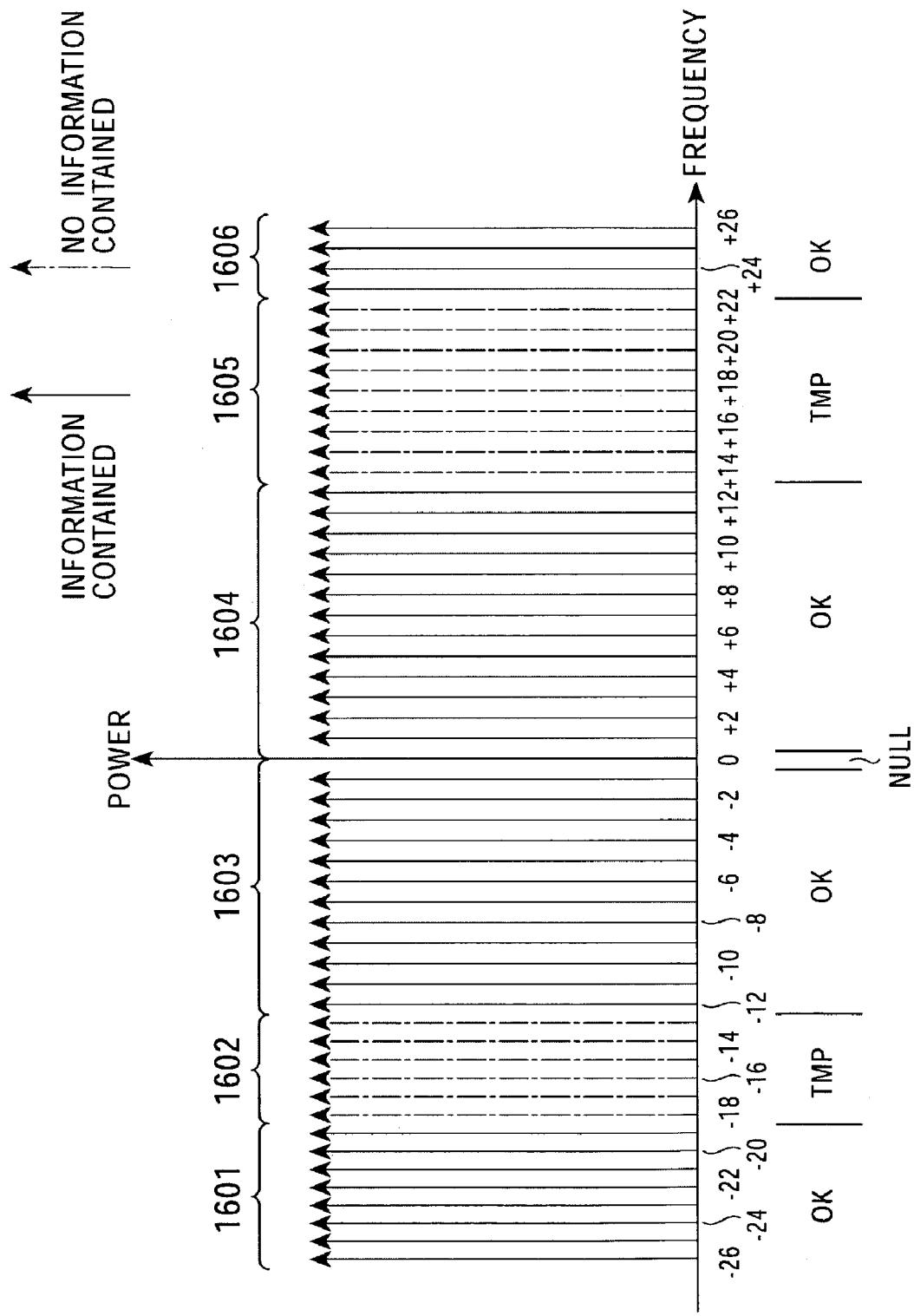
FIG. 16 illustrates power imparted to each carrier transmitted from the communication apparatus.

FIG. 16 illustrates power imparted to each carrier transmitted from the communication apparatus 1 in the transmission mode selected in the fourth transmission mode selection method. The transmission mode is selected when the determination information is inserted in the state shown in FIG. 5. As shown in FIG. 16, a mapping point is assigned at the same power level as in the conventional art to each of the unused carriers contained in regions 1602 and 1605. A mapping point is assigned at the same power level as in the conventional art to each of the used carriers contained in regions 1601, 1603, 1604, and 1606. No information is contained in the unused carriers in the regions 1602 and 1605.

In accordance with the fourth transmission mode selection method, the transmission signal in each symbol is at the same power level, and regardless of whether the carrier is used or unused, a constant signal strength is provided.

Fifth Transmission Mode Selection Method

A fifth transmission mode selection method applicable to the present embodiment is discussed below. In the fifth transmission mode selection method, a carrier to be used and an unused carrier are determined based on the determination information inserted in the transmission data. A mapping point is assigned to the unused carrier so that a response in peak amplitude in time is lowered. The amplitude and phase of the unused carrier are optimized and a mapping process is performed so that a response in peak amplitude in time is lowered. The mapping points in this case are not necessarily the mapping point defined in the transmission mode.

Figure 17A:
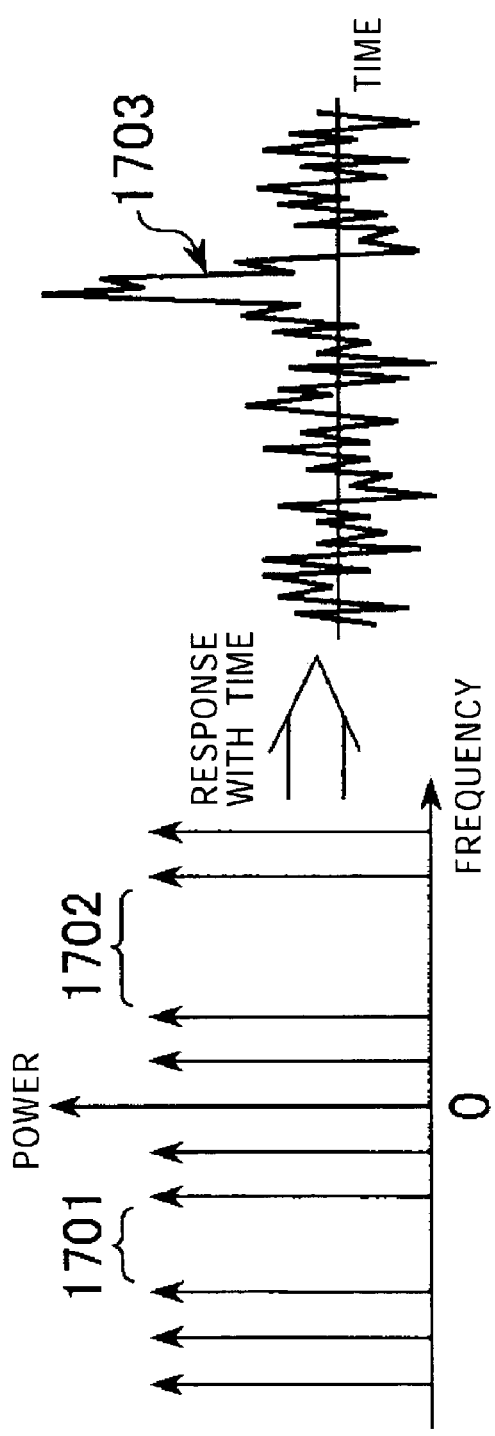
FIG. 17A illustrates power per carrier and the response thereof with time in a second transmission mode selection method.
Figure 17B:
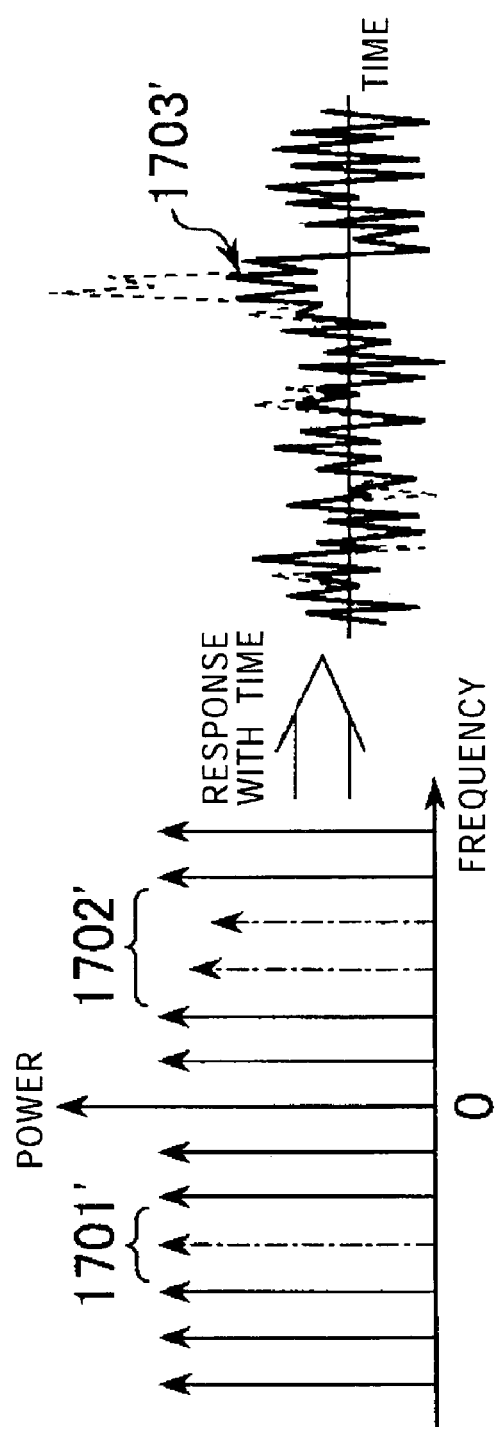
FIG. 17B illustrates power per carrier and the response thereof with time in a fifth transmission mode selection method.

FIG. 17A illustrates power per carrier and the response thereof with time when transmission data is transmitted in the second transmission mode selection method. FIG. 17B illustrates power per carrier and the response thereof with time when transmission data is transmitted in the fifth transmission mode selection method. Referring to FIG. 17A, regions 1701 and 1702 are determined as being unusable. No power is assigned to the carriers in these regions. As a result, a peak amplitude 1703 appears as a response in time scale.

In accordance with the fifth transmission mode selection method, mapping points are assigned to the carriers contained in regions 1701' and 1702' as shown in FIG. 17B corresponding to the regions 1701 and 1702 determined as being unusable so that a response in the peak value in time is lowered. As a result, a peak amplitude 1703' is controlled to be smaller than the corresponding peak amplitude 1703.

The fifth transmission mode selection method reduces a peak amplitude in time of transmitted signals containing the plurality of carriers, thereby reducing distortion in the entire transmission system, and improving performance.

Sixth Transmission Mode Selection Method

A sixth transmission mode applicable to the present embodiment is discussed below. The sixth transmission selection mode selects the transmission mode by defining the same transmission mode for a plurality of carriers. A plurality of carriers are divided into groups, and the transmission mode is assigned to the carriers in the same group.

Figure 18:
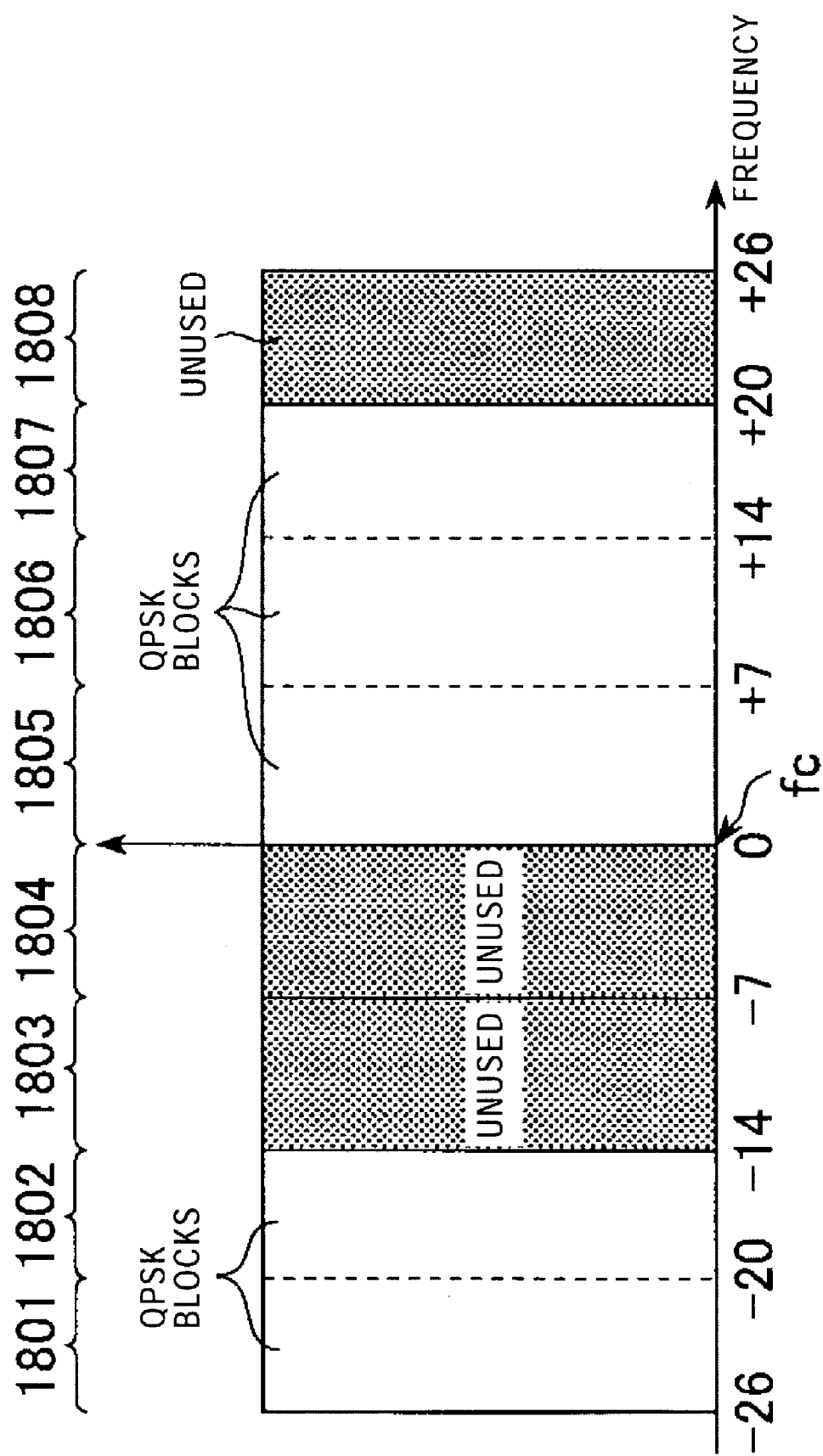
FIG. 18 illustrates a transmission mode selection example in response to received determination information illustrated in FIG. 6.

FIG. 18 illustrates a transmission mode selection example wherein the same transmission mode is designated on a per group basis in response to received determination information illustrated in FIG. 6. As shown, the same transmission mode (QPSK in FIG. 18) is designated on each of regions (groups) 1801, 1802, 1805, 1806, and 1807, respectively corresponding to the regions 61, 62, 65, 66, and 67 determined as being usable in FIG. 6. The carriers contained in the regions (groups) 1803, 1804, and 1808, respectively corresponding to the regions 63, 64, and 68 determined as being unusable in FIG. 6, are determined as being unused (to be used).

The sixth transmission mode selection method is appropriate for use with the determination information that is obtained using the third determination method.

Seventh Transmission Mode Selection Method

A seventh transmission mode selection method applicable to the present embodiment will now be discussed. In the seventh transmission mode selection method, the transmission mode is selected by assigning a different transmission mode on a per carrier basis. The modulation scheme and encoding rate become different from carrier to carrier. To assign a different encoding rate, a separate encoder 103 may be arranged for a respective encoding rate.

Figure 19:
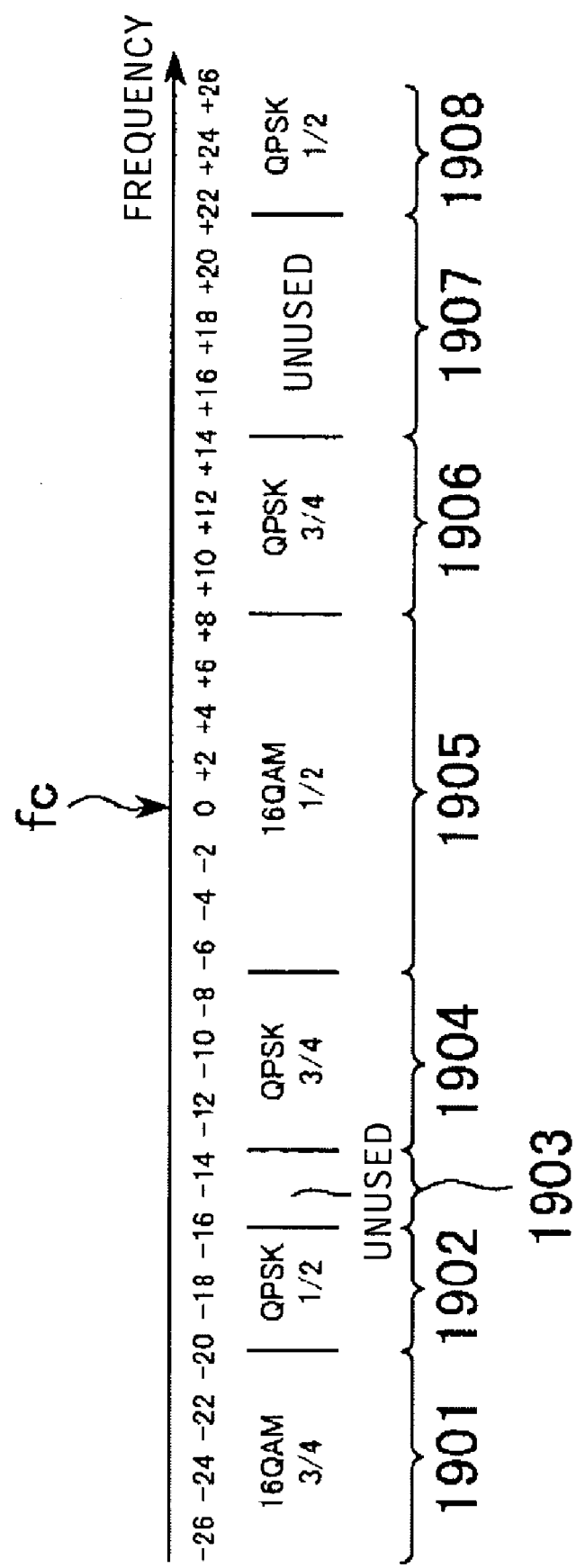
FIG. 19 illustrates a status in which a transmission mode different from carrier to carrier is designated.

FIG. 19 illustrates a status in which a transmission mode different from carrier to carrier is designated. As shown, an encoding rate of ¾ and modulation scheme 16 QAM are designated for the carriers contained in a region 1901, an encoding rate of ½ and modulation scheme QPSK are designated for the carriers contained in regions 1902 and 1908, an encoding rate of ¾ and modulation scheme QPSK are designated for the carriers contained in regions 1904 and 1906, and an encoding rate of ½ and modulation scheme 16 QAM are designated for the carriers contained in a region 1905. The carriers contained in the region 1905 are determined as being unused (to be used).

The seventh transmission mode selection method is appropriate for use with the determination information that is obtained using the third determination method.

Transfer Method of the Transmission Information

The transfer method of the transmission mode information is discussed below.

The transmission mode may be transferred on a per carrier basis. For example, information containing codes representing "OK" or "NG" may be inserted on a carrier by carrier basis.

Figure 20:
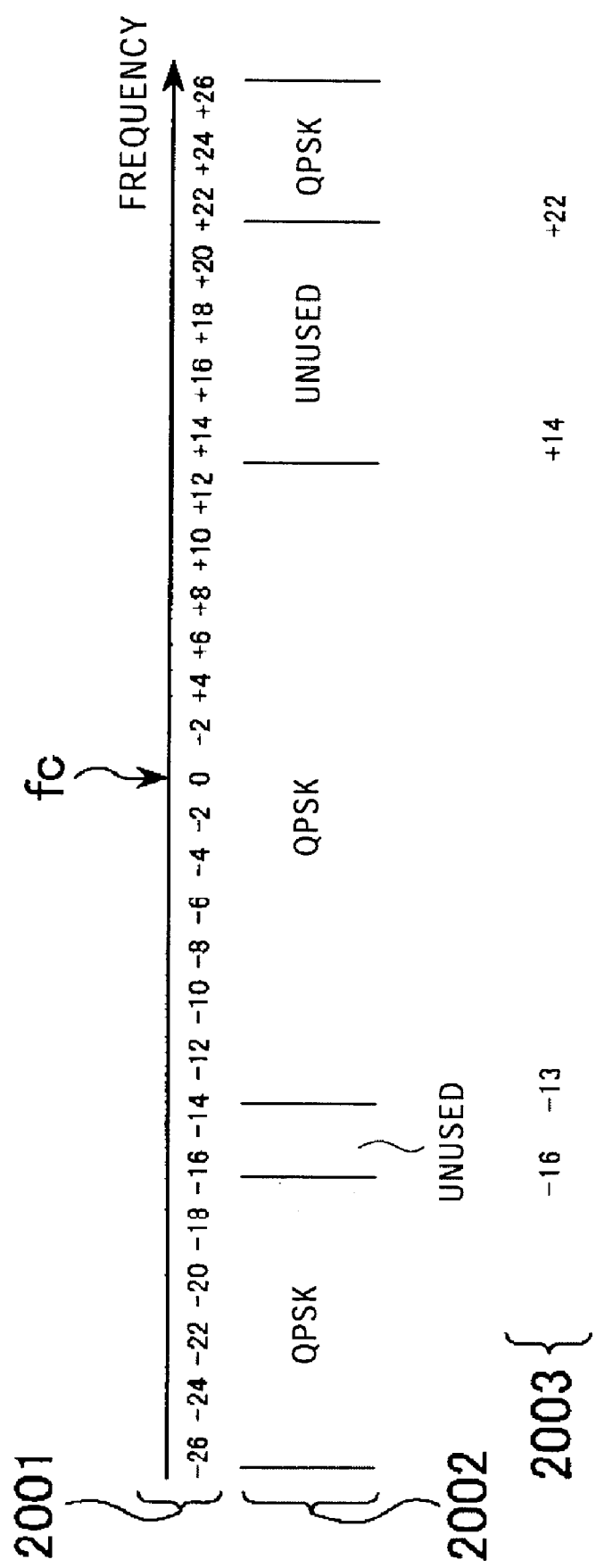
FIG. 20 illustrates a transfer method of another piece of transmission mode information.

In another method to transfer the transmission mode, the inserted transmission mode information may be inserted for a plurality of carriers in a collective manner rather than on a carrier by carrier basis. FIG. 20 illustrates such a transfer method of the transmission mode information. As shown, a frequency bandwidth 2001 centered on a center frequency fc±26 is used as a transmission band. Used here are 52 (=26× 2) carriers. A determination result 2002 is fed to the determination information inserter 104 by the transmission mode selector 116. Here, the label "OK" indicating that the carrier is usable, and the label "NG" indicating that the carrier is unusable are generated. A sequence of signals 1003 is an example of determination information which is inserted into the transmission data by the transmission mode information inserter 104. The determination information includes a carrier number "−16" at which the determination result is transitioned from "OK" to "NG", a carrier number "−13" at which the determination result is transitioned from "NG" to "OK", a carrier number "+14" at which the determination result is transitioned from "OK" to "NG", and a carrier number "+22" at which the determination result is transitioned from "NG" to "OK". The transmitter communication apparatus 1 transmits information of "−16, −13, +14, and +22" as the determination information. Upon receiving the information, the transmission mode determiner 114 in the communication apparatus 1 determines from the determination information that the determination result is a "predetermined modulation scheme (QPSK in FIG. 20)" from the carrier number −26 through the carrier number −17, that the determination result is an "unused status" from the carrier number −18 through the carrier number −11, that the determination result is a "predetermined modulation scheme (QPSK in FIG. 20)" from the carrier number −12 through the carrier number +13, that the determination result is an "unused status" from the carrier number +14 through the carrier number +22, and that the determination result is a "predetermined modulation scheme (QPSK in FIG. 20)" from the carrier number +23 through the carrier number +26. The determination results are then fed to the demapper 111 and decoder 112.

This transmission mode transfer method substantially reduces the amount of information compared with the case in which the transmission mode is transferred on a per carrier basis.

Figure 21:
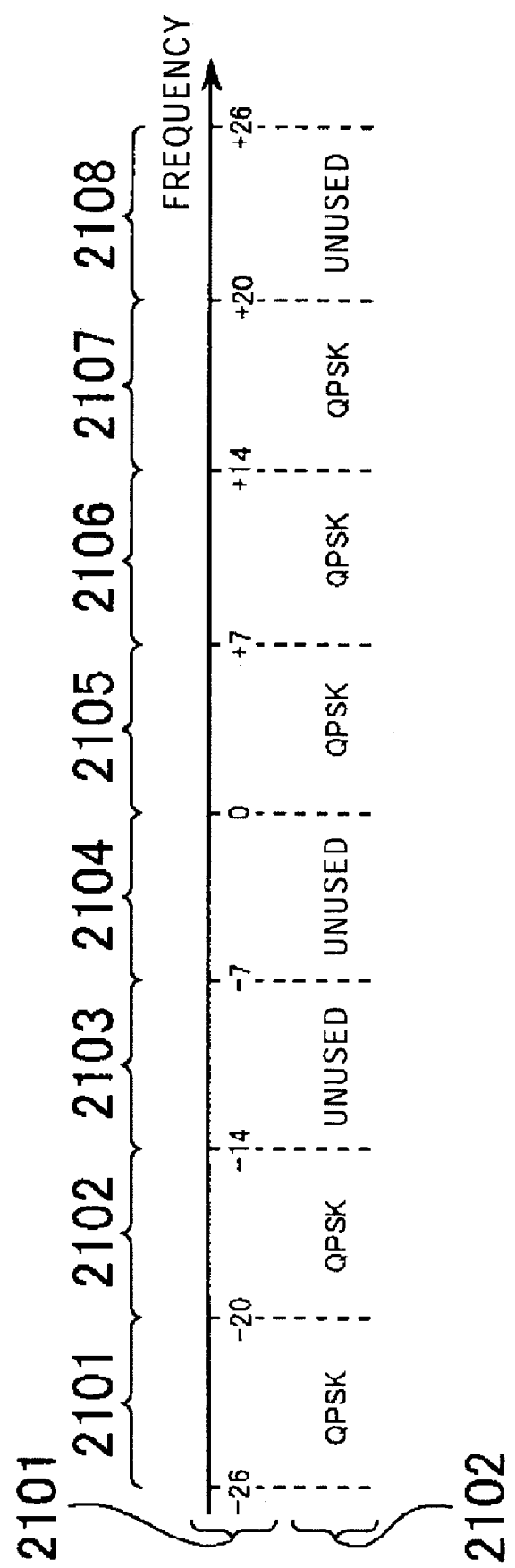
FIG. 21 illustrates a transfer method of yet another piece of transmission mode information.

Another transmission mode information transfer method is discussed with reference to FIG. 21. A plurality of consecutive carriers are grouped in a block, and a used/unused status is transferred on a block by block basis. One transmission mode is used here in FIG. 21. This transmission mode information transfer method is applicable even when a plurality transmission modes may be selectively used.

As shown, a frequency bandwidth centered on a center frequency fc±26 is used as a transmission band. Used here are 52 (=26×2) carriers as shown in FIG. 21. The carriers are grouped into 8 blocks, i.e., blocks 2101-2108. The transmission mode information inserter 104 generates and inserts transmission mode information 2102 into the transmission data. The transmission mode information 2102 contains information representing a used/unused status of the carriers in each block.

Figure 22:
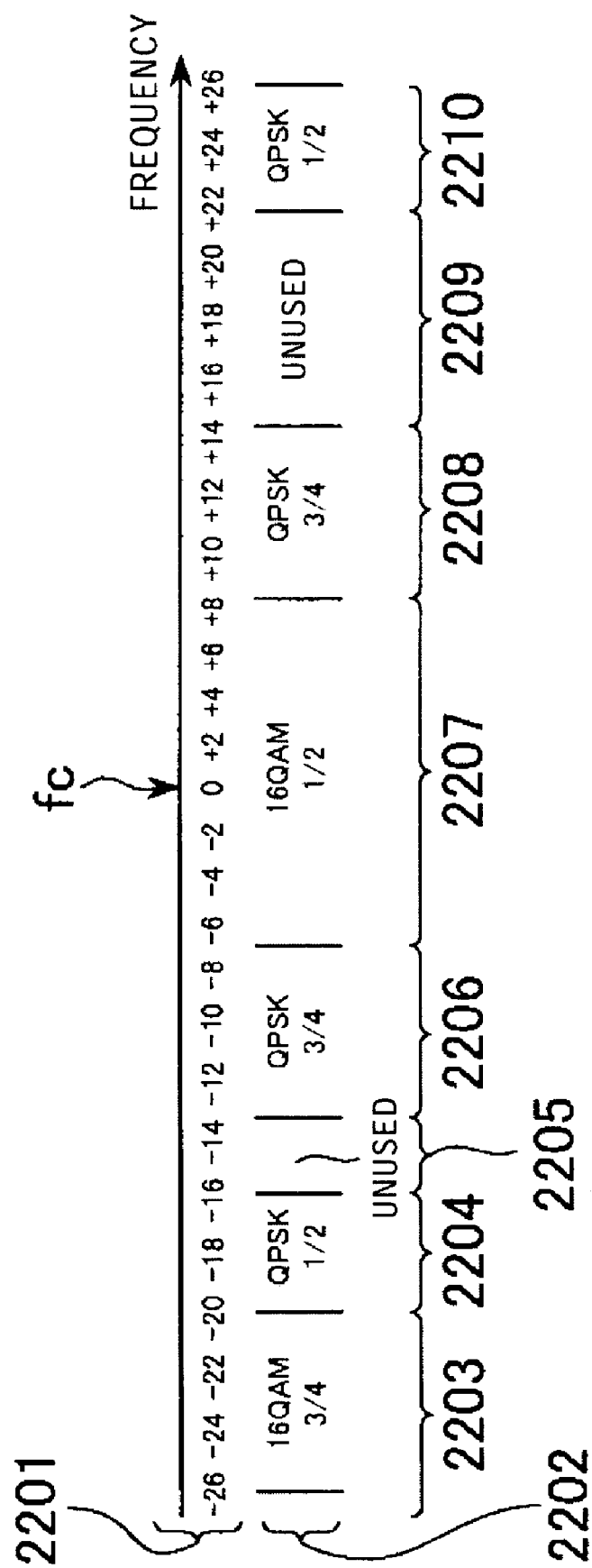
FIG. 22 illustrates a transmission mode transfer method in which transmission mode information to be inserted is different from carrier to carrier.

A further transmission mode transfer method is discussed with reference to FIG. 22. FIG. 22 illustrates the transmission mode transfer method carried out by the transmission mode information inserter 104 which inserts transmission modes different from carrier to carrier. The transmission mode different from carrier to carrier is transferred in combination with the selection result of the selection method shown in FIG. 19.

Referring to FIG. 22, a frequency bandwidth centered on a center frequency fc±26 is used as a transmission band 2201. Used here are 52 (=26×2) carriers. The carriers are grouped into 8 blocks, i.e., blocks 2203-2210. The transmission mode information inserter 104 generates and inserts transmission mode information 2202 into the transmission data. The transmission mode information 2202 contains information representing the modulation scheme, encoding rate, and unused status on a per carrier basis.

As shown, an encoding rate of ¾ and modulation scheme 16 QAM are designated for the carriers contained in the block 2203, an encoding rate of ½ and modulation scheme QPSK are designated for the carriers contained in the blocks 2204 and 2210, an encoding rate of ¾ and modulation scheme QPSK are designated for the carriers contained in the blocks 2206 and 2208, and an encoding rate of ½ and modulation scheme 16 QAM are designated for the carriers contained in the block 2207. The carriers contained in the blocks 2205 and 2209 are determined as being unused (to be used). These pieces of transmission mode information are inserted into the transmission signal.

Figure 23:
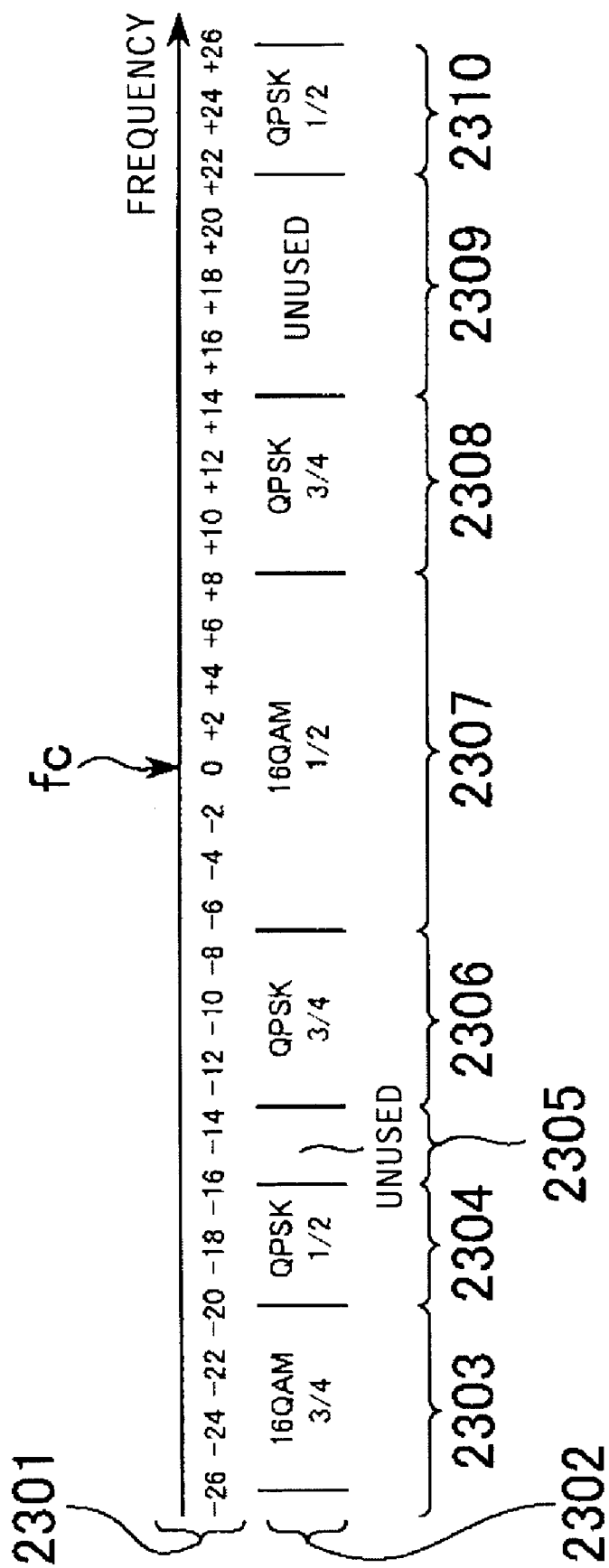
FIG. 23 illustrates the example of designation of a demapping method.
Figure 24:
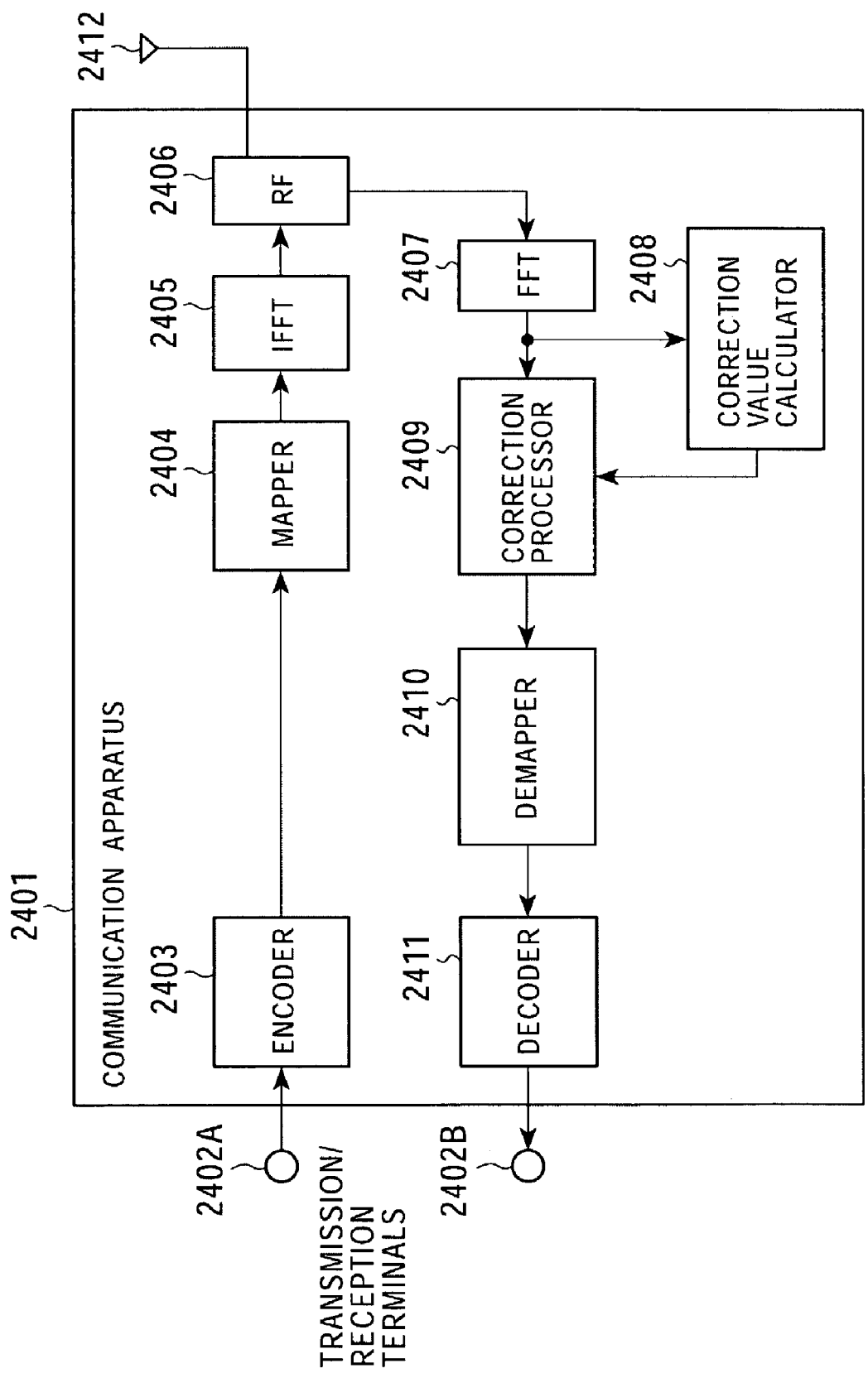
FIG. 24 is a block diagram illustrating a conventional OFDM communication apparatus.
Figure 25:
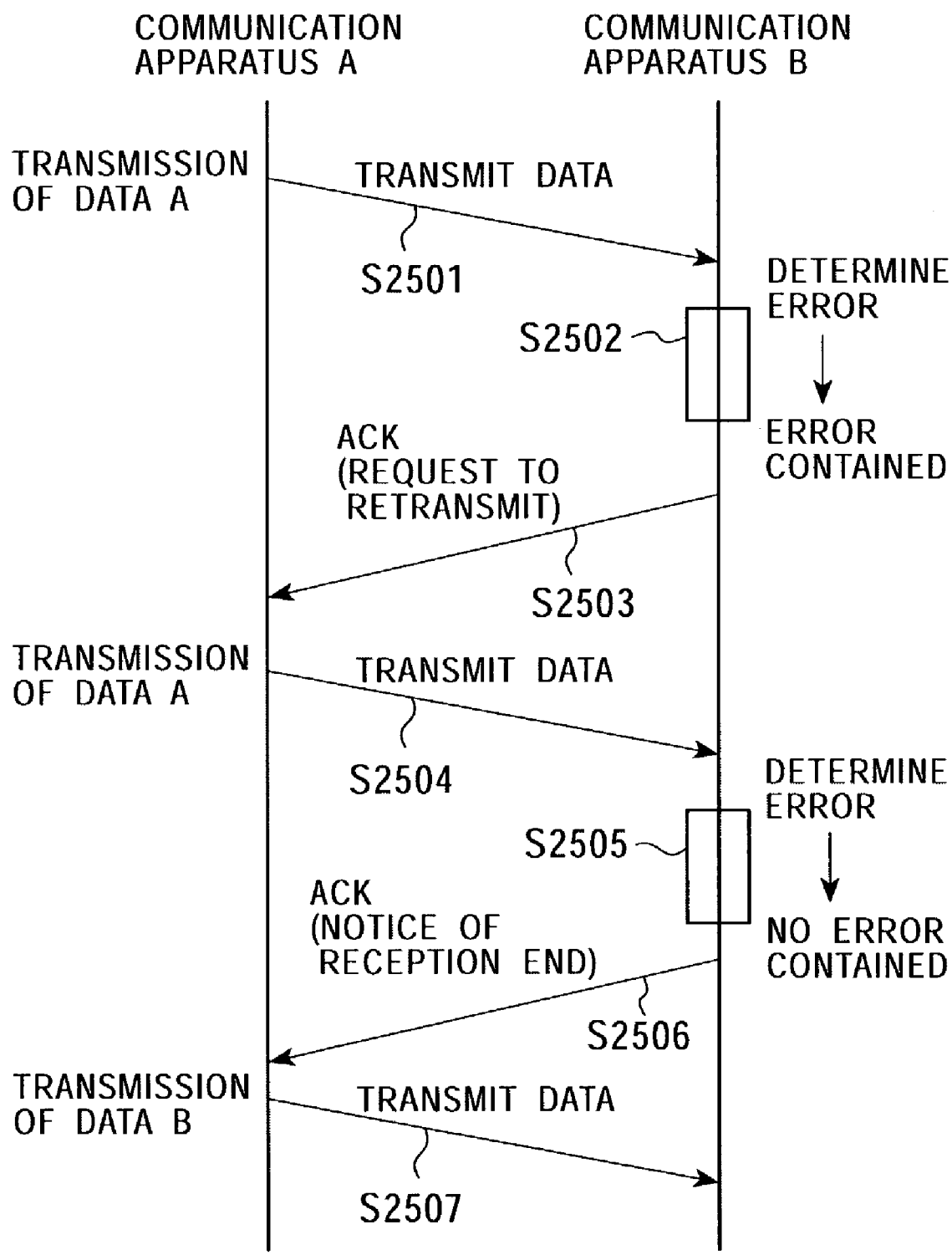
FIG. 25 is a data flow illustrating an operation which is performed when a request to retransmit transmission data is issued.
Figure 26:
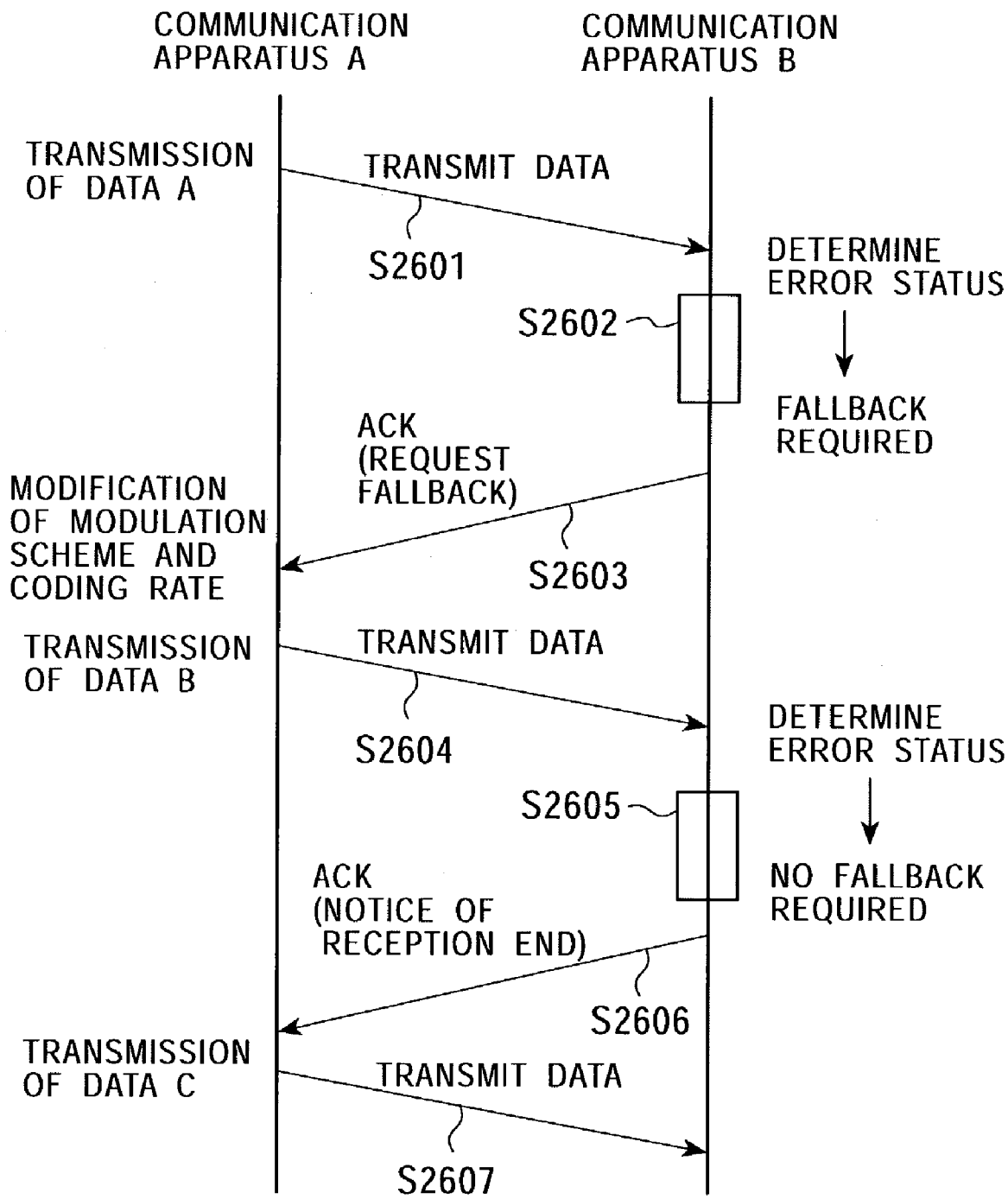
FIG. 26 is a data flow illustrating a conventional fallback process.

FIG. 23 illustrates a demapping method carried out by the transmission mode determiner 114. The transmission mode determiner 114 designates a demapping process that is carried out on the transmission mode different from carrier to carrier when the transmission mode shown in FIG. 22 is received. The transmission mode determiner 114 designates the demapping process different from carrier to carrier in response to the selection result obtained using the selection method shown in FIG. 19. The decoder 112 may be arranged on a per encoding rate basis.

Modifications

The communication apparatus 1 may be modified as discussed below.

The order of arrangement of the determination information inserter 102, encoder 103, and transmission mode information inserter 104 is not limited to the configuration shown in FIG. 2. For example, the order of arrangement of these units may be reversed. Along with such a modification, signal input points to the transmission mode determiner 114 and transmission mode selector 116 may be changed accordingly.

In the above embodiment, the signal input to the determination information inserter 102 may be also input to the transmission mode selector 116 in the same communication apparatus 1.

In accordance with the present invention, the reception status is determined and is then transferred to avoid using a carrier that cannot be received well. An error rate of data subsequent to the error correction process is reduced, and the number of transmissions of a request to retransmit is also reduced.

By using a usable carrier only, a highly efficient transmission rate is achieved. Even if the number of carriers in use is reduced, a significantly high degree of transmission rate is maintained. The apparatus of the present invention thus provides a reliable quality of communication to a host module.

Since the transmission mode is selected taking into consideration the reception status, communication is performed with an error rate maintained at a constant level. In this arrangement, the apparatus reliably operates in a host module.

What is claimed is:

1. A communication system for a radio communication method using a plurality of received carriers, the communication system comprising:
 means for determining a reception status of the plurality of received carriers;
 means for identifying, based on the reception status, which carriers of the of plurality of received carriers are usable;
 means for inserting into a first transmission signal indications of the identified usable carriers of the plurality of received carriers;
 means for selecting a transmission mode corresponding to the identified usable carriers of the plurality of received carriers indicated by the first transmission signal;
 means for inserting, into a second transmission signal, an indication of the selected transmission mode;
 means for determining the transmission mode by extracting the indication of the transmission mode from the second transmission signal; and
 means for transmitting or receiving signals using the identified usable carriers of the plurality of received carriers based on the extracted transmission mode.

2. A communication system according to claim 1, further comprising means for calculating a correction value of a received signal, wherein the means for determining the reception status determines the reception status based on the correction value.

3. A communication apparatus for a radio communication method using a plurality of received carriers, the communication apparatus comprising:
 means for determining a reception status of the plurality of received carriers;
 means for identifying, based on the reception status, which carriers of the plurality of received carriers are usable;
 means for inserting into a first transmission signal indications of the identified usable carriers of the plurality of received carriers;
 means for selecting a transmission mode corresponding to the identified usable carriers of the plurality of received carriers indicated by the first transmission signal;
 means for inserting, into a second transmission signal, an indication of the selected transmission mode;
 means for determining the transmission mode based on the transmission mode indicated by the second transmission signal; and
 means for transmitting or receiving signals using the identified usable carriers of the plurality of received carriers based on the determined transmission mode.

4. A communication apparatus according to claim 3, further comprising means for calculating a correction value of a received signal, wherein the means for determining the reception status determines the reception status based on the correction value.

5. A communication apparatus according to claim 3, wherein the means for determining the reception status determines the reception status based on the correction value, the reception status relating to an amplitude component of a received signal.

6. A communication apparatus according to claim 3, wherein the means for determining the reception status determines the reception status based on a variation in a phase component of a received signal.

7. A communication apparatus according to claim 3, wherein the means for determining the reception status determines the reception status based on a plurality of threshold levels with respect to a received signal.

8. A communication apparatus according to claim 3, wherein the the means for determining the reception status determines the reception status based on a threshold level that achieves a desired error rate subsequent to an error correction.

9. A communication apparatus according to claim 3, wherein the means for selecting assigns no signal power to a carrier which is unused in information transmission.

10. A communication apparatus according to claim 3, wherein the means for selecting assigns a signal point to a carrier used in information transmission such that a signal power of a symbol remains constant.

11. A communication apparatus according to claim 3, wherein the means for selecting assigns a signal point to a carrier unused in information transmission such that a signal power of a symbol remains constant.

12. A communication apparatus according to claim 3, wherein the means for selecting assigns a signal point to a carrier unused in signal transmission so that a peak amplitude of a symbol becomes smaller.

13. A communication apparatus according to claim 3, wherein the means for selecting collectively assigns a transmission mode to the plurality of carriers in a group.

14. A communication apparatus according to claim 3, wherein the means for selecting assigns a modulation scheme and an encoding rate to the carriers on a per carrier basis.

15. A communication apparatus according to claim 3, wherein the means for determining a transmission mode performs a plurality of different transmission mode processes different from carrier to carrier.

16. A communication method using a plurality of carriers, the communication method comprising the steps of:

transmitting a request to transmit;

determining, based on the request to transmit, a reception status of the plurality of carriers;

identifying, based on the reception status, which carriers of the plurality of carriers are usable;

transmitting, in response to the request to transmit, an acknowledgement of the request indicating the identified usable carriers of the plurality of carriers;

selecting a transmission mode corresponding to the identified usable carriers of the plurality of carriers based on the request acknowledgement;

transmitting an indication of the selected transmission mode in a transmission signal;

determining the transmission mode from the transmission signal;

demodulating a received signal as to the identified usable carriers of the plurality of carriers based on the determined transmission mode; and acknowledging that the selected transmission mode has been received.

17. A communication method according to claim 16, wherein the reception status is determined using correction coefficient information of the request to transmit.

* * * * *